US011577875B2

(12) United States Patent
Duckett et al.

(10) Patent No.: US 11,577,875 B2
(45) Date of Patent: Feb. 14, 2023

(54) HYBRID HAND LABELER

(71) Applicant: AVERY DENNISON RETAIL INFORMATION SERVICES, LLC, Mentor, OH (US)

(72) Inventors: Jeanne Duckett, Franklin, OH (US); Frederick Pou, Centerville, OH (US); Timothy Brown, Dayton, OH (US); Jesus Romo, Jr., Fairborn, OH (US); Mark Morrow, Kettering, OH (US); Txus Carrion, Bayern (DE); Dee Sawyer, Spring Valley, OH (US); John Mistyurik, Troy, OH (US); Leah Burch, Beavercreek, OH (US); John Gallant, Dayton, OH (US); Kartavyakumar Patel, Fairborn, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 141 days.

(21) Appl. No.: 16/444,571

(22) Filed: Jun. 18, 2019

(65) Prior Publication Data

US 2019/0382150 A1 Dec. 19, 2019

Related U.S. Application Data

(60) Provisional application No. 62/686,437, filed on Jun. 18, 2018.

(51) Int. Cl.

*B32B 41/00* (2006.01)
*B65C 11/02* (2006.01)
*B41J 3/407* (2006.01)

(52) U.S. Cl.

CPC ......... *B65C 11/0242* (2013.01); *B41J 3/4075* (2013.01); *B65C 2210/0002* (2013.01); *B65C 2210/0043* (2013.01)

(58) Field of Classification Search

CPC ......... B65C 11/0242; B65C 2210/0002; B65C 2210/0043; B41J 3/4075; B41J 3/36

(Continued)

(56) References Cited

U.S. PATENT DOCUMENTS 3,787,267 A * 1/1974 Neer ......................... B65C 9/22 156/363
D238,101 S 12/1975 Mulholland (Continued)

FOREIGN PATENT DOCUMENTS

CN 101837689 9/2010
CN 102844242 12/2012

(Continued)

OTHER PUBLICATIONS

International Preliminary Report on Patentability dated Dec. 22, 2020 issued in corresponding IA No. PCT/US2019/037703 filed Jun. 18, 2019.

(Continued)

*Primary Examiner* — Michael N Orlando
*Assistant Examiner* — Joshel Rivera

(57) ABSTRACT

A portable hybrid hand labeler is disclosed that relies on mechanical motion, which eliminates the need for motors and the corresponding energy required to run the motors. The portable hybrid hand labeler also houses an ink jet head and a digital print mechanism, which offers the user infinite print flexibility via downloadable print bands. The portable hybrid hand labeler is preferably battery driven, and comprises a unique drive system and mechanism to harvest the kinetic energy from the trigger pull and a display panel with a solar panel to collect solar energy to trickle charge the battery pack, thereby increasing usage time between charges.

20 Claims, 25 Drawing Sheets

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| D247,390 | S | 2/1978 | Sato |
| 4,131,504 | A | 12/1978 | Furutu |
| D252,518 | S | 7/1979 | Sato |
| D253,240 | S | 10/1979 | Sato |
| D253,241 | S | 10/1979 | Sato |
| D253,242 | S | 10/1979 | Sato |
| D253,243 | S | 10/1979 | Sato |
| D295,534 | S | 5/1988 | Brossard et al. |
| 4,830,522 | A | 5/1989 | Sato et al. |
| 4,904,330 | A | 2/1990 | Vanderpool et al. |
| D347,238 | S | 5/1994 | Patzak |
| 6,105,497 | A | 8/2000 | Hermann |
| D542,336 | S | 5/2007 | Nishizaka |
| D607,491 | S | 1/2010 | Arena |
| D629,839 | S | 12/2010 | Hermann |
| 8,011,405 | B2 | 9/2011 | Sleiman et al. |
| 8,376,015 | B2 | 2/2013 | Guenter et al. |
| 8,616,699 | B2 | 12/2013 | Mistyurik et al. |
| 8,783,984 | B2 | 7/2014 | Kim et al. |
| 9,132,666 | B2 | 9/2015 | Lo et al. |
| 9,708,091 | B2 | 7/2017 | Gilbertson et al. |
| 9,878,564 | B2 | 1/2018 | Mueller et al. |
| 2002/0023722 | A1* | 2/2002 | Mistyurik ........... B65C 11/0247 156/384 |
| 2002/0172537 | A1 | 11/2002 | Hamisch et al. |
| 2005/0002715 | A1 | 1/2005 | Fries et al. |
| 2008/0062213 | A1 | 3/2008 | Edwards et al. |
| 2009/0065150 | A1 | 3/2009 | Tharp et al. |
| 2010/0051201 | A1* | 3/2010 | Sleiman ................ B65C 11/004 156/361 |
| 2010/0103238 | A1 | 4/2010 | Neuhard et al. |
| 2012/0069118 | A1* | 3/2012 | Mistyurik .............. B41J 3/4075 347/109 |
| 2016/0350624 | A1 | 12/2016 | Liguori et al. |
| 2017/0028731 | A1 | 2/2017 | Ko et al. |

FOREIGN PATENT DOCUMENTS

| | | |
|---|---|---|
| CN | 103057775 | 4/2013 |
| CN | 103079829 | 5/2013 |
| CN | 203211605 U | 9/2013 |
| CN | 104053549 | 9/2014 |
| CN | 303542959 | 1/2016 |
| CN | 107175935 | 9/2017 |
| CN | 207725047 | 8/2018 |
| EP | 1990283 | 7/2013 |
| GB | 2319755 | 6/1998 |
| JP | 2003-171049 | 6/2003 |
| WO | 2011/163548 | 12/2011 |

OTHER PUBLICATIONS

International Search Report and Written Opinion dated Aug. 7, 2019 issued in corresponding IA No. PCT/US2019/037703 filed Jun. 18, 2019.

International Search Report and Written Opinion dated Aug. 28, 2019 issued in corresponding IA No. PCT/US2019/037711 filed Jun. 18, 2019.

International Preliminary Report on Patentability dated Dec. 22, 2020 issued in corresponding IA No. PCT/US2019/037711 filed Jun. 18, 2019.

Amazon. Link: https://www.amazon.com/gp/product/B01ACDKG2Q/ref=ask_ql_qh_dp_hza. Feb. 4, 2016. Amram 2 Line 8 Characters Top/6 Characters Bottom Price Marking Gun Includes 1 Ink Roller for use with 21×17mm Labels. (Year: 2016).

Amazon. Link: https://www.amazon.com/Monarch-925082-Pricemarker-2-Line-Characters/dp/B003DXPCGI/ref=sr_1_2?keywords=Monarch+925082&qid=1569526163&sr=8-2. May 3, 2006. Monarch 925082 Pricemarker. (Year: 2006).

* cited by examiner

HYBRID HAND LABELER

CROSS REFERENCE TO RELATED APPLICATION(S)

The present application claims priority to and the benefit of U.S. provisional utility patent application No. 62/686,437 filed on Jun. 18, 2018, which is incorporated herein by reference in its entirety.

BACKGROUND

The present invention relates generally to a hybrid hand labeler that combines the mechanical motion of a traditional mechanical hand labeler with the benefits and advantages of digital printing. More specifically, the present invention relates to an improved, easy to manufacture, load and use hand-held labeler for printing and applying pressure sensitive labels to an object, such as a retail good. The hybrid hand labeler of the present invention is durable, relatively inexpensive and incorporates easy to use features such as a user display that enables the user to view and/or modify the printable image, and a sensor to detect when the user has engaged the labeler lever/trigger sufficiently to mechanically advance the label and to signal the control board to commence the printing of the label. The hybrid hand labeler of the present invention may be battery and/or solar powered, and is comprised of downloadable print bands that provide the user with greater print variability and flexibility.

By way of background, mechanical hand labelers have been in the market for over 40 years, and can be somewhat efficient for the labeling of items, such as retail products, with data having limited variability. More specifically, the process of depressing molded indicia against an ink roller and then depressing it onto a label, paper or other media is a simple cost effective method of marking. Further, the ink used in this process has the added advantage of being sun resistant.

However, while traditional mechanical hand labelers can be cost effective, they also tend to have poor print quality, especially with respect to larger fonts. In fact, the relationship between the size of the font being printed by the mechanical hand labeler and the quality of the print is inversely proportional. Stated differently, the quality of the mechanical hand labeler print decreases as the size of the font increases. This inversely proportional relationship is attributable, in part, to the non-flexible print bands of the hand labeler. More specifically, the print bands of the mechanical hand labelers are molded prior to the assembly of the device. Therefore, the mechanical labeler print bands offer little if any print flexibility, whereas a digital print mechanism offers infinite print flexibility.

Additionally, portable printers and/or hand labelers tend to be inefficient with respect to energy consumption, which limits the functionality and usage time between recharging. In addition, currently available portable printers depend on lithium ion battery technology.

Therefore, there exists in the art a long felt need for an improved, portable hand labeler that offers greater print flexibility and variability. There is also a long felt need in the art for a portable hand labeler that minimizes energy consumption and device downtime attributable to recharging of the device. The present invention discloses a hybrid hand labeler that relies on mechanical motion and digital printing using an ink jet head. The hybrid hand labeler also minimizes energy consumption by eliminating the need for motors, by harvesting kinetic energy from the otherwise required trigger/lever pulls, and by providing a solar panel on the display panel to collect solar energy that can be used to trickle charge the hand labeler's battery pack. The portable hybrid hand labeler of the present invention is also capable of being used with alkaline or NiCad batteries, both of which are more commonly available to the average consumer and are easily transportable.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, is a portable hybrid hand labeler comprised of an ink jet head and a digital print mechanism which offers infinite print flexibility to its user. The hybrid hand labeler is also comprised of a housing having an upper housing portion and a lower housing portion. The upper housing portion houses an ink jet head to provide for flexibility and better print quality, and allows the user to quickly and easily access the interior of the housing for the loading of labels, wiping the ink jet head, for cleaning and for removing stray labels and jams, etc. The upper housing portion mounts the ink jet print head for single pass printing, while the pressure sensitive supplies, such as labels, are moving past the head to the peel point. The lower housing portion has a handle and mounts a manually engaged actuator, a sensor to detect engagement, a toothed driver, a plurality of gears and a pawl and a ratchet mechanism. A deflector, the actuator, one of the gears and the pawl and ratchet mechanism are operable to advance the driver and a supply of pressure sensitive material. A plurality of racks on the deflector in the supply path engage with the gears when the section is in a closed or operating position. However, when the deflector in the supply path is in an open or non-operating position, the racks do not engage with the gears.

A roll or supply of pressure sensitive material can be mounted in the lower housing portion about an axis, and the upper housing portion can rotate to its open position about the same axis. When the pawl and ratchet mechanism are released, a portion of the label or supply roll is advanced past the fixed position print head. When the lever is activated (i.e., pulled back in the direction of the handle), a sensor is engaged and signals to a controller and eventually the print head that the printing process should begin. A printer latching mechanism (hook) connects to the bottom portion of the hand labeler ensuring a positive connection between the top cover and the lower cover. A printhead open sensor detects if the mechanism is open prior to engaging the ink jet head.

The hybrid hand labeler further comprises a multi-functioning movable member in the housing that provides a brake surface, guides the label web and mounts a die roll, which partially surrounds the toothed driver and has a finger-engage recess. The labeler further comprises another multi-functioning member upon which a brake roll and a direction changing roll are mounted. An assembly comprised of a platen and a stripper is also provided for dispensing the printed upon labels.

The hybrid hand labeler further comprises a plurality of downloadable print bands, which enable simple data input with greater print flexibility and variability. The portable hybrid hand labeler also relies on mechanical motion with respect to paper/media/label movement, which eliminates the need for motors and the corresponding energy required to operate said motors. Further, the hybrid hand labeler could comprise a mechanism to harvest the kinetic energy from the otherwise required trigger/lever pull to trickle charge the labeler battery pack, thereby increasing usage time between charges and overall productivity of the hybrid hand labeler.

In another embodiment of the present invention, the hybrid hand labeler may also further comprise at least one solar panel positioned on or near the display panel. The solar panel enables the user to gather solar energy that, in turn, can be used to trickle charge the labeler battery pack, thereby prolonging the time between battery charges and increasing the efficiency of the hybrid hand labeler.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
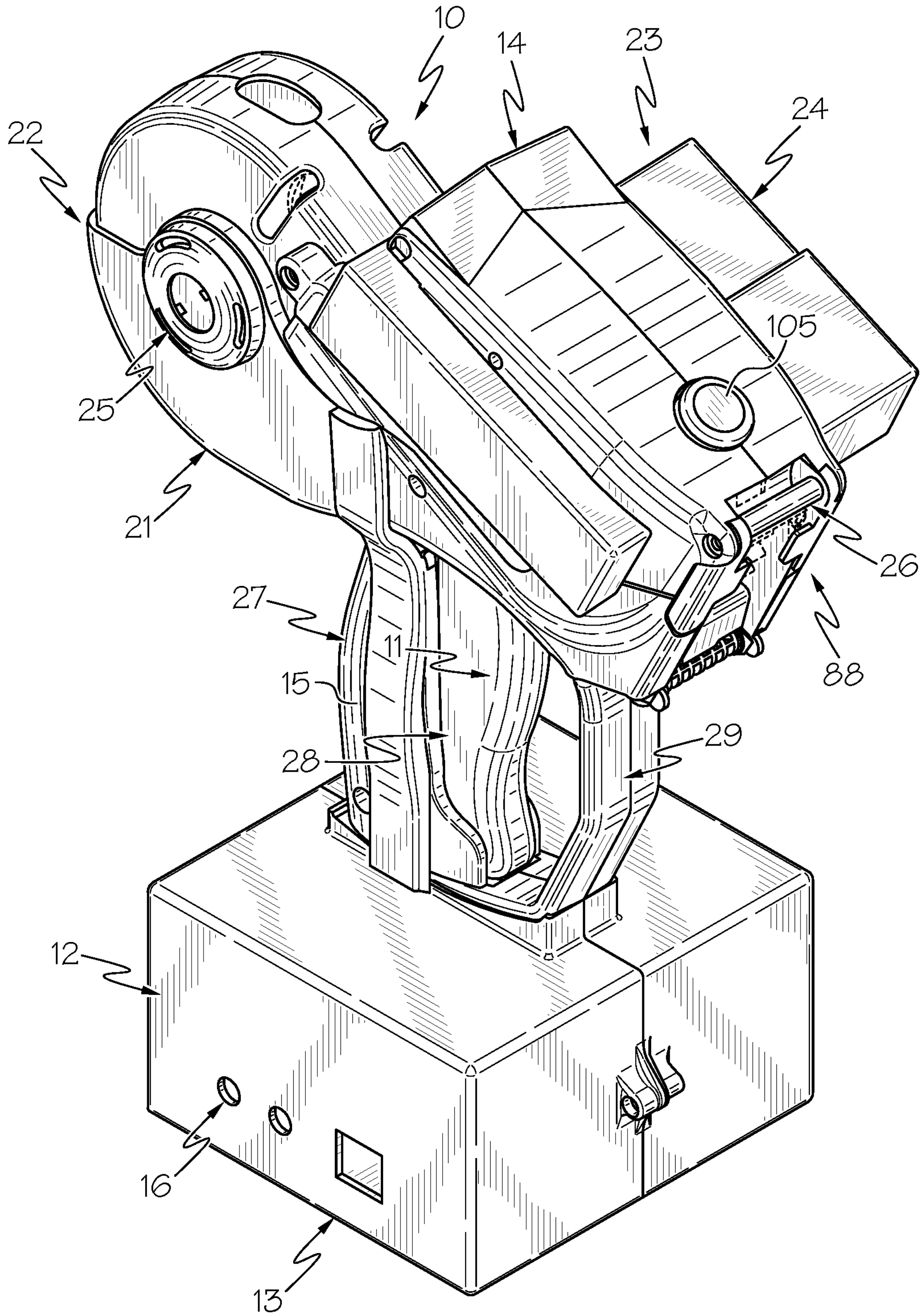
FIG. 1 illustrates a perspective view of the hybrid hand labeler in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a portable hybrid hand labeler that comprises an ink jet head and a digital print mechanism which offers the user infinite print flexibility, as well as a unique drive mechanism. More specifically, the portable hybrid hand labeler of the present invention relies on mechanical motion and the unique drive mechanism to advance the supply or web of paper/media stock or pressure sensitive material, which eliminates the need for motors and the corresponding energy required to run the motors. The portable hybrid hand labeler may also comprise a mechanism to harvest the kinetic energy from the otherwise required trigger/lever pull, and a display panel with a solar panel to collect solar energy that can, in turn, be used to trickle charge a battery pack or otherwise power the labeler device, thereby increasing usage time between charges and improving overall productivity of the hybrid hand labeler.

Referring generally to the drawings, FIGS. 1-14 illustrate several views of the portable hybrid hand labeler 10 of the present invention, and its various components. The hybrid hand labeler 10 is adapted to receive a supply of pressure sensitive labels or other media 89, which can be housed on an accompanying supply roll holder until needed. More specifically, the supply roll of media 89 may be housed on the supply roll holder and advanced on demand through a feed path via a roller and across a printing surface to receive a desired WYSIWYG text or graphic when a lever of the hybrid hand labeler is released, as described in greater detail below.

Referring specifically to the drawings, FIG. 1-8 illustrate a portable hybrid hand labeler 10 comprising a housing 21, a supply roll holder 25, and an ink jet print head 24'. As illustrated in FIG. 1, housing 21 comprises a lower housing portion 22, an upper housing portion 23 and a mount 24 for receipt of the ink jet print head 24'. The ink jet print head 24' may be a thermal ink jet, a piezo ink jet print head, or any other type of print head that would be compatible with hybrid hand labeler 10.

Figure 4:
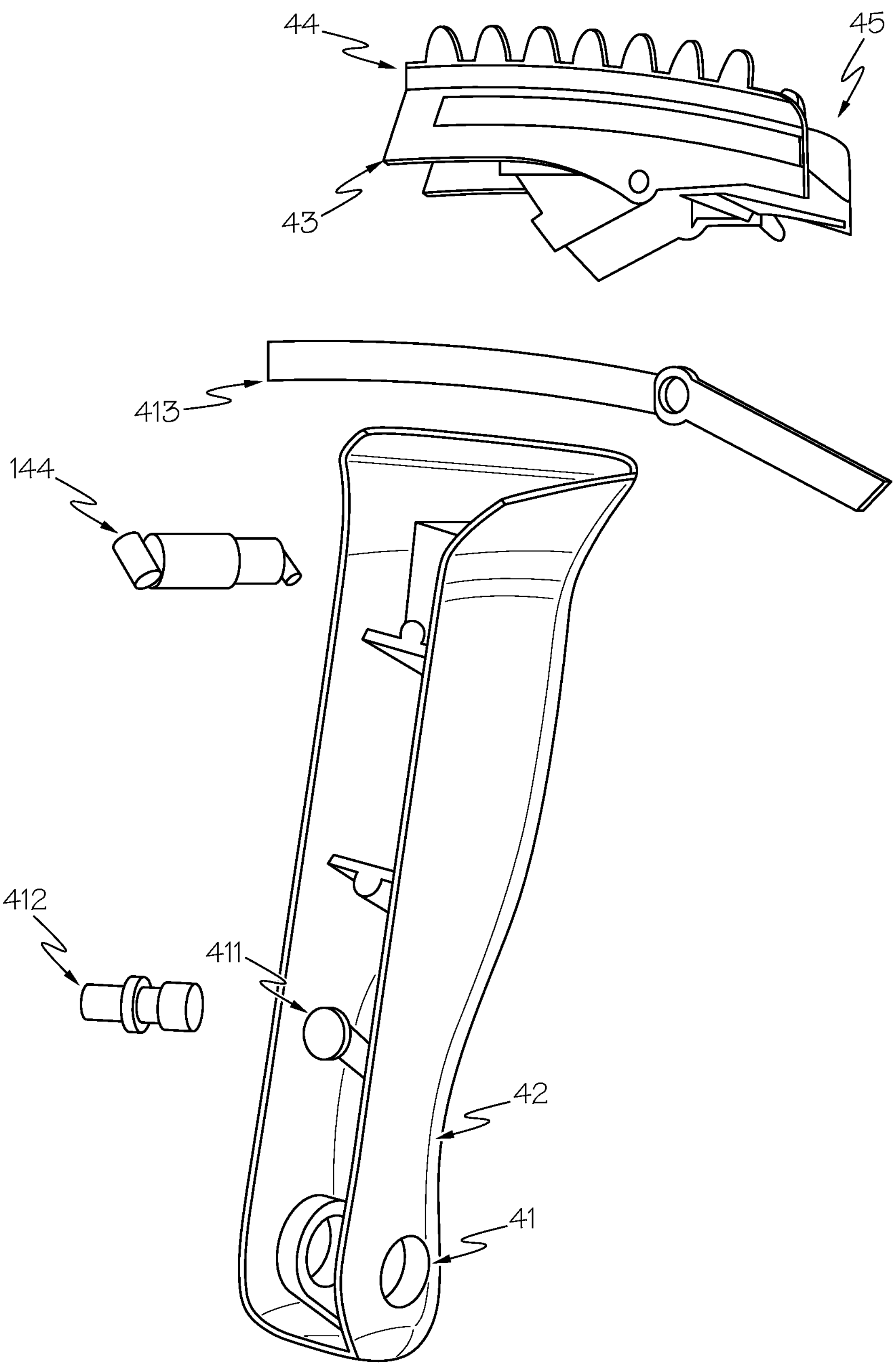
FIG. 4 illustrates a perspective, partially exploded view of the actuator components of the hybrid hand labeler in accordance with the disclosed architecture.
Figure 4A:
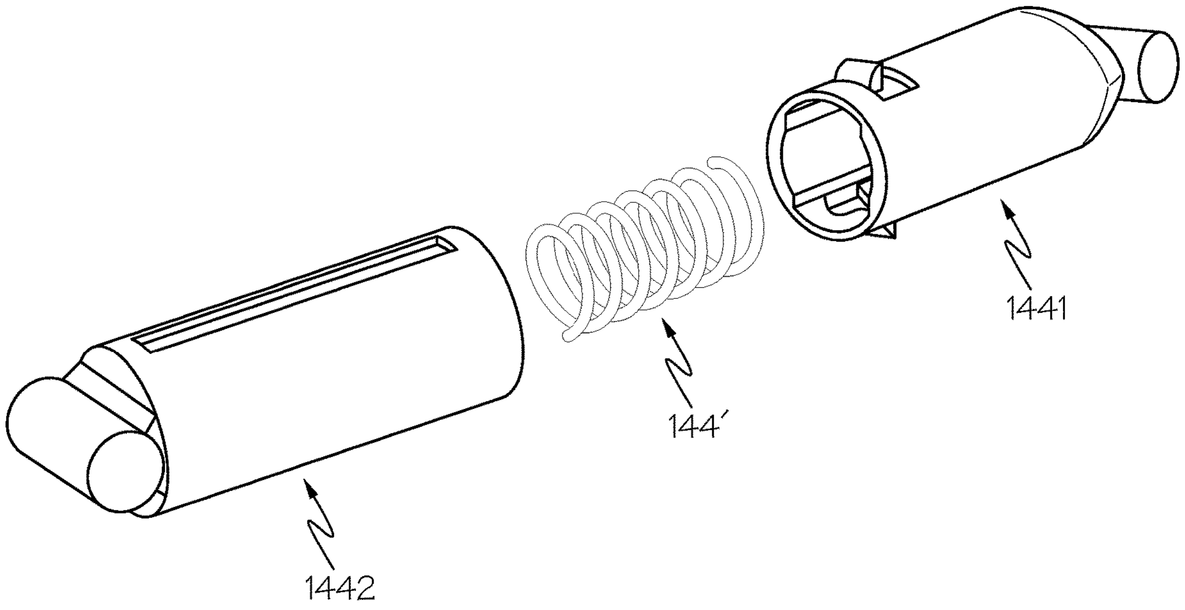
FIG. 4A illustrates a part exploded view of the energy spring assembly and showing the housing and compression spring.

Housing 21 may be manufactured or molded from a lightweight, durable plastic material, or any other suitable material as is known in the art. The housing 21 further comprises a handle 27 typically configured as a downwardly extending, manually graspable handle. Further, the handle 27 comprises an actuator 28. As best shown in FIGS. 1 and 4, the manually engage-able actuator 28 is positioned along the handle 27 and is comprised of a lever 11, a sensor 412 for detecting movement of the lever 11, and a spring assembly 144 having a compression spring 144' encased within and between front spring housing 1441 and rear spring housing 1442, as shown in FIG. 4. A knuckle guard 29 is connected to, or formed in, an underside of lower housing portion 22 at one end of said knuckle guard, and to a lower end portion of handle 27 at the opposite end of the knuckle-guard 29. The area or space between knuckle guard 29 and actuator 28 accommodates a user's fingers, and allows for secure handling of the hybrid hand labeler 10.

Figure 2:
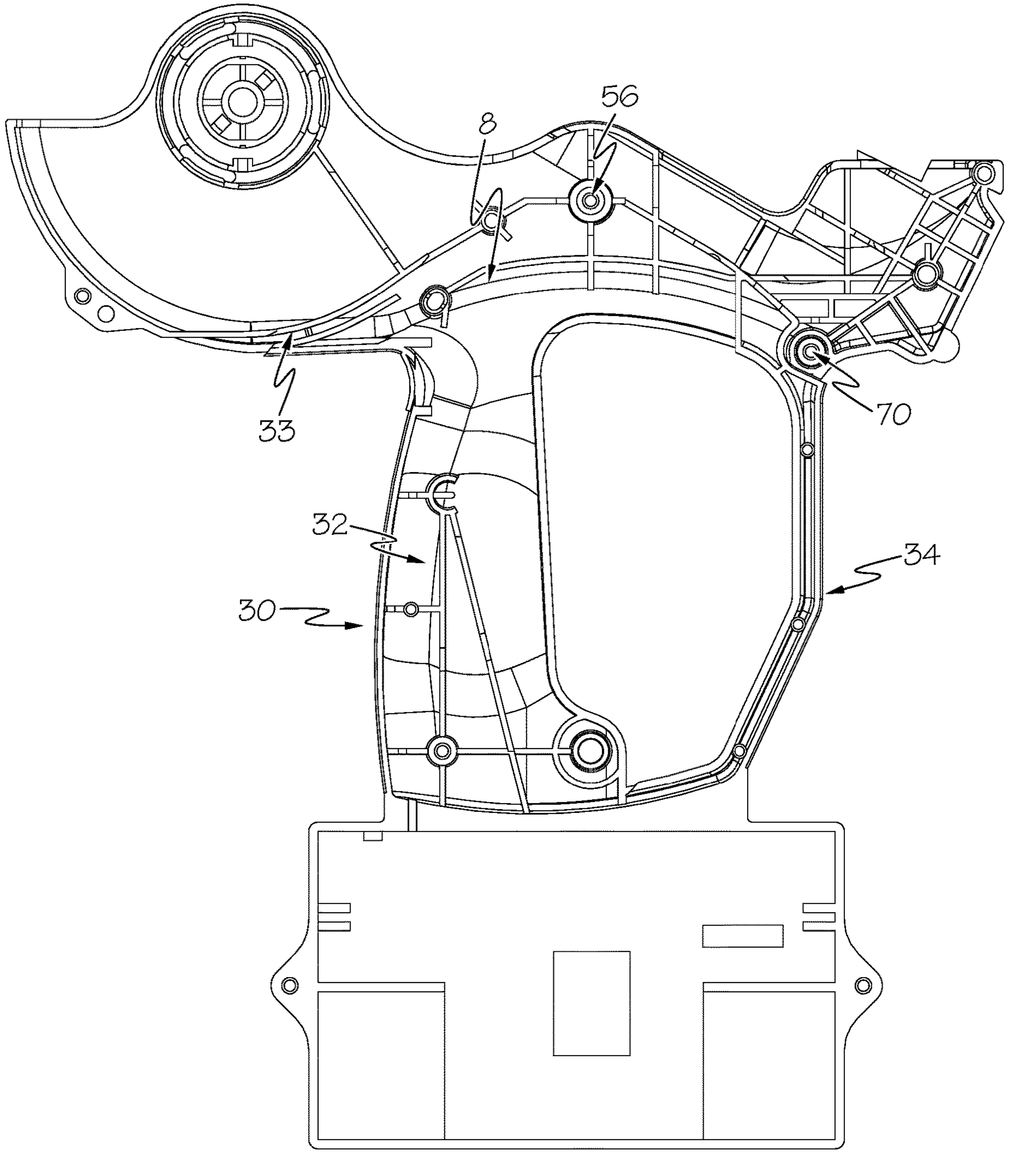
FIG. 2 illustrates a left side partial cross-sectional view of the hybrid hand labeler in accordance with the disclosed architecture.
Figure 3:
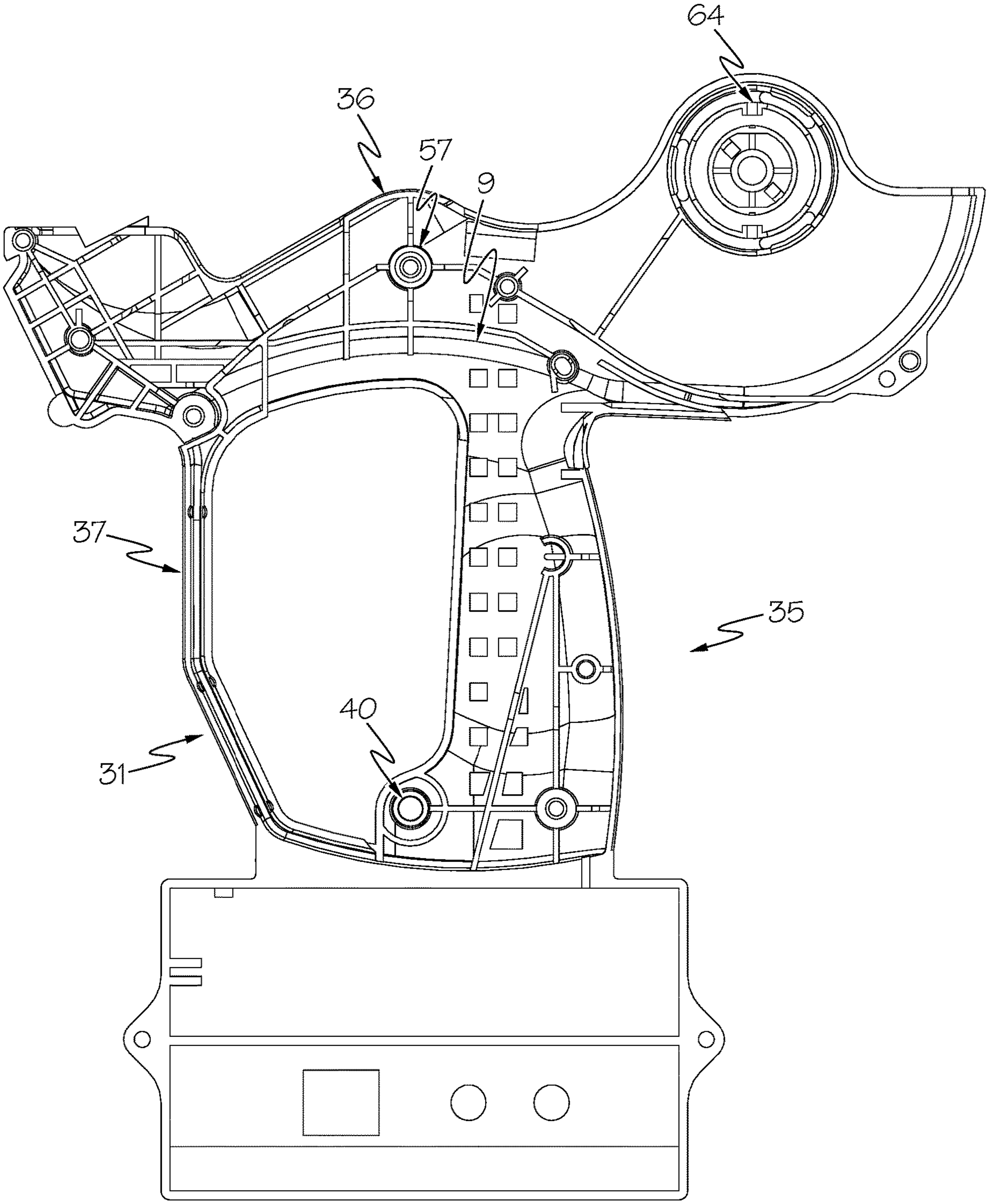
FIG. 3 illustrates a right side partial cross-sectional view of the hybrid hand labeler in accordance with the disclosed architecture.
Figure 8:
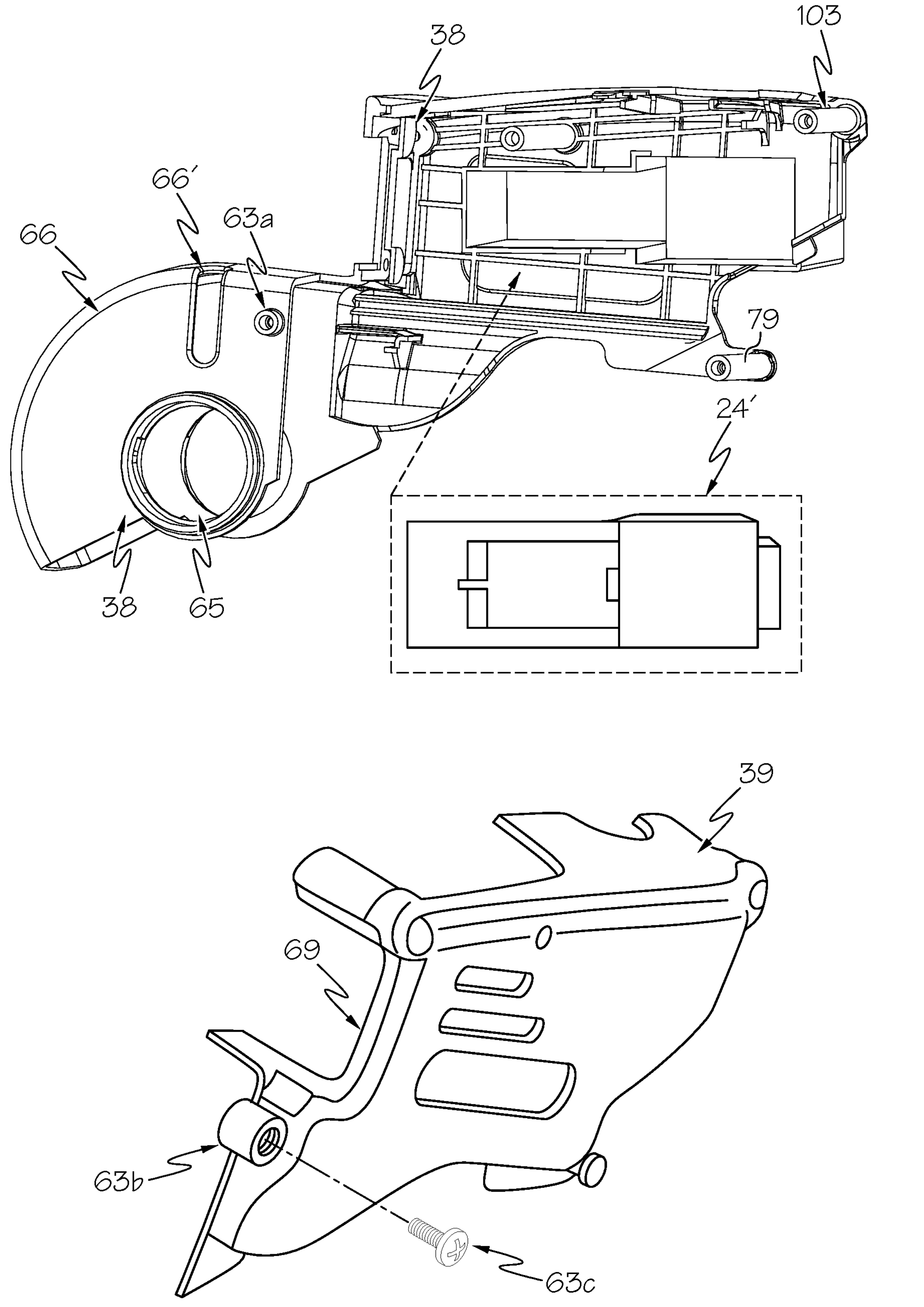
FIG. 8 illustrates a perspective, partially exploded view of the upper right and left printer covers with a thermal print head of the hybrid hand labeler in accordance with the disclosed architecture.

With reference to FIGS. 2 and 3, lower housing portion 22 has a left side 30 and a right side 31. The left side 30 comprises a handle portion 32 of handle 27, a body portion 33, and a knuckle guard portion 34 of knuckle guard 29. Similarly, the right side 31 of lower housing portion 22 comprises a corresponding handle portion 35 of handle 27, a body portion 36, and a knuckle guard portion 37 of knuckle guard 29. Likewise, as illustrated in FIG. 8, the upper housing portion 23 also comprises a left side portion 38 and a right side portion 39.

As illustrated in FIGS. 1-4, lever 11 of actuator 28 is pivotally mounted on a post 40 passing through an opening 41 in the lever 11. More specifically, the post 40 is disposed at a lower end portion of the handle portion 35, and opening 41 is disposed at a lower end portion 42 of lever 11. There is sufficient space in lever 11 above the location of opening 41 to retain an energy cell battery or similar power storage component that would be accessible or otherwise activatable via the sensor 412, as best illustrated in FIG. 4. Sensor 412 not only engages encoder board 1700 as explained more fully below, but is also capable of powering the control board shown in FIG. 16. In terms of mechanical hand labelers, the term energy cell refers to the spring housing and the compression spring. In one embodiment of the present invention, the energy cell may be located at the top of the lever 11 where it engages with the feed rack 43 when the user releases lever 11.

Hybrid hand labeler 10 further comprises a user display 14 and a joystick 25 (best illustrated in FIGS. 13-14) for enabling the user to operate and interact with hybrid hand labeler 10, both of which are described more fully below. As best illustrated in FIG. 1, the hybrid hand labeler 10 further comprises a label applicator 26 that is disposed at an upper front portion of the housing 21, and is also further described below.

Hybrid hand labeler 10 may further comprise an electronics housing or case 12 positioned at an end of handle 27 opposite the lower portion 22 of the housing 21. Case 12 is useful for storing the batteries, cells or other power sources for labeler 10, or a controller/processor/MPU board 700, electronic components, etc. Depending on its geometric configuration, which may be varied to suit user preference or need, the case 12 may further serve as a base or a stand for hybrid hand labeler 10 when the same is not in use, or is being charged. Of course, one of ordinary skill in the art will also appreciate that case 12, and the various components stored therein, may be positioned elsewhere along hybrid hand labeler 10 to suit the needs and wants of the user, such as described supra.

As best shown in FIGS. 1-3, case 12 may further comprise a power switch 13 for powering hybrid hand labeler 10 on/off, as well as one or more ports 16, such as USB or other accessory or communication ports for communicating with other devices such as a computer, tablet or other smart device. Case 12 is easily accessible by a user, and may further comprise a removable access panel or other access point.

As best shown in FIG. 1, the hybrid hand labeler 10 may further comprise a cable housing 15 positioned along, for example, the side of handle 27 opposite lever 11 and knuckle guard 29. Cable housing 15 is useful for housing/protecting the signal and potential power cables that extend from case 12 to print head 24', and may be constructed from the same or a different lightweight, durable plastic material as housing 21 or handle 27, or any other suitable material as is known in the art. Nonetheless, it is also contemplated that said cables could be stored or housed within or alongside handle 27 as well.

FIG. 4 illustrates a perspective, partially exploded view of the various components of actuator 28. More specifically, the actuator 28 comprises a feed rack 43 that separates a supply feed of a web of pressure sensitive material 89 (illustrated in FIG. 11) from the lever 11, and a tipping component 413 for movably connecting the feed rack 43 to the lever 11.

Figure 5:
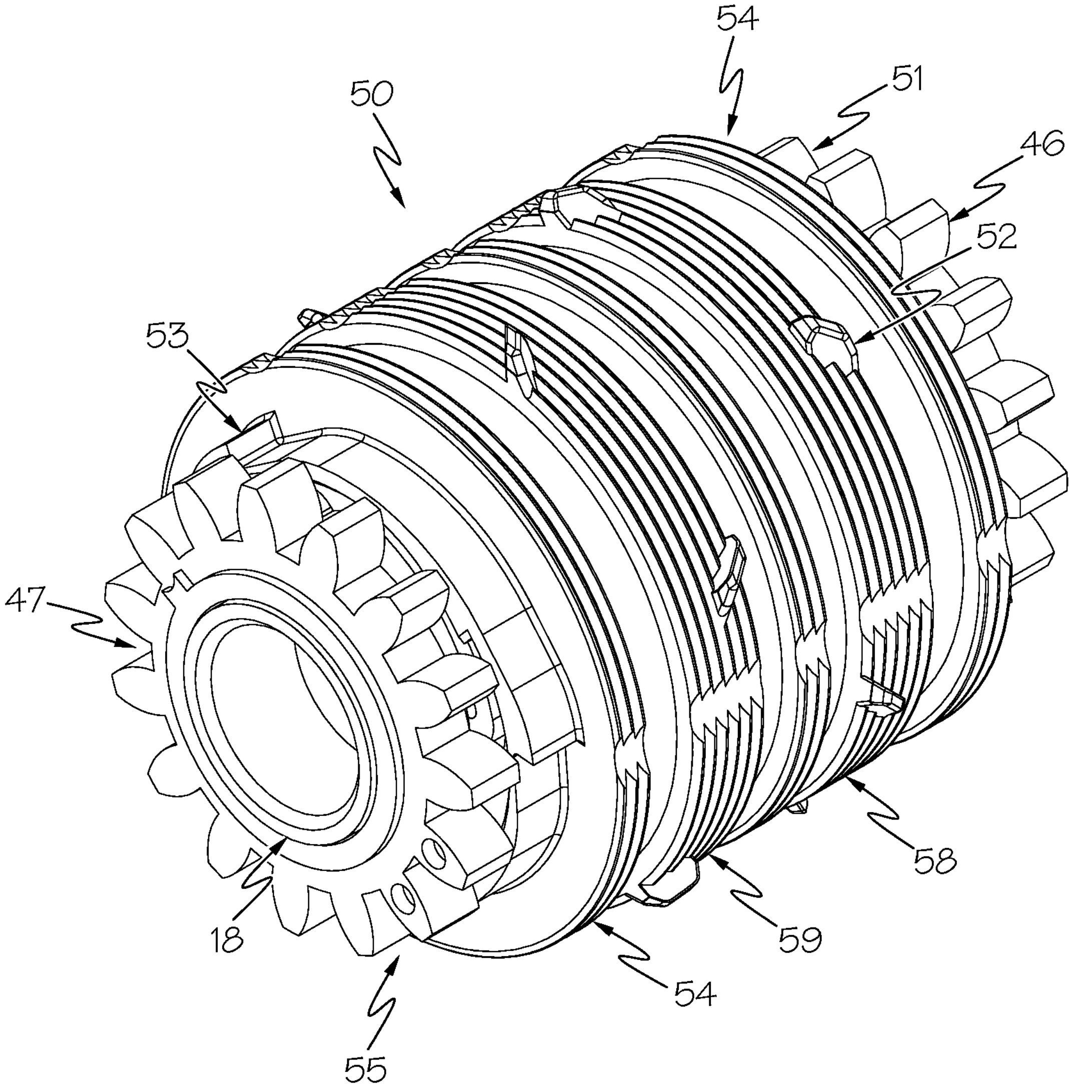
FIG. 5 illustrates a perspective view of the toothed driver with illustrated elements of the hybrid hand labeler in accordance with the disclosed architecture.

As illustrated in FIG. 5, the hybrid hand labeler 10 further comprises a toothed driver 50 that is comprised of a pair of gears 46 and 47, a feed wheel 51, a ratchet wheel 53, a reflective encoder disk 54, a pawl 55, and a plurality of annular rings 58, 59 which may, in one embodiment of the present invention, be part of the feed wheel. Feed wheel 51 comprises a plurality of spaced apart teeth 52 and is disposed between gears 46 and 47. Ratchet wheel 53 is preferably integrally formed with feed wheel 51. Additionally, feed wheel 51 and ratchet wheel 53 are coaxial, and gears 46 and 47 are coaxial and rotatably mounted on hub sections of feed wheel 51. The pawl 55 is typically integrally formed into gear 47, which cooperates with ratchet wheel 53 to advance feed wheel 51 stepwise. When the pawl 55 engages with ratchet wheel 53 and the feed wheel 51 rotates, a portion of the supply of pressure sensitive material 89 is advanced past the fixed position print head 24'.

Figure 6:
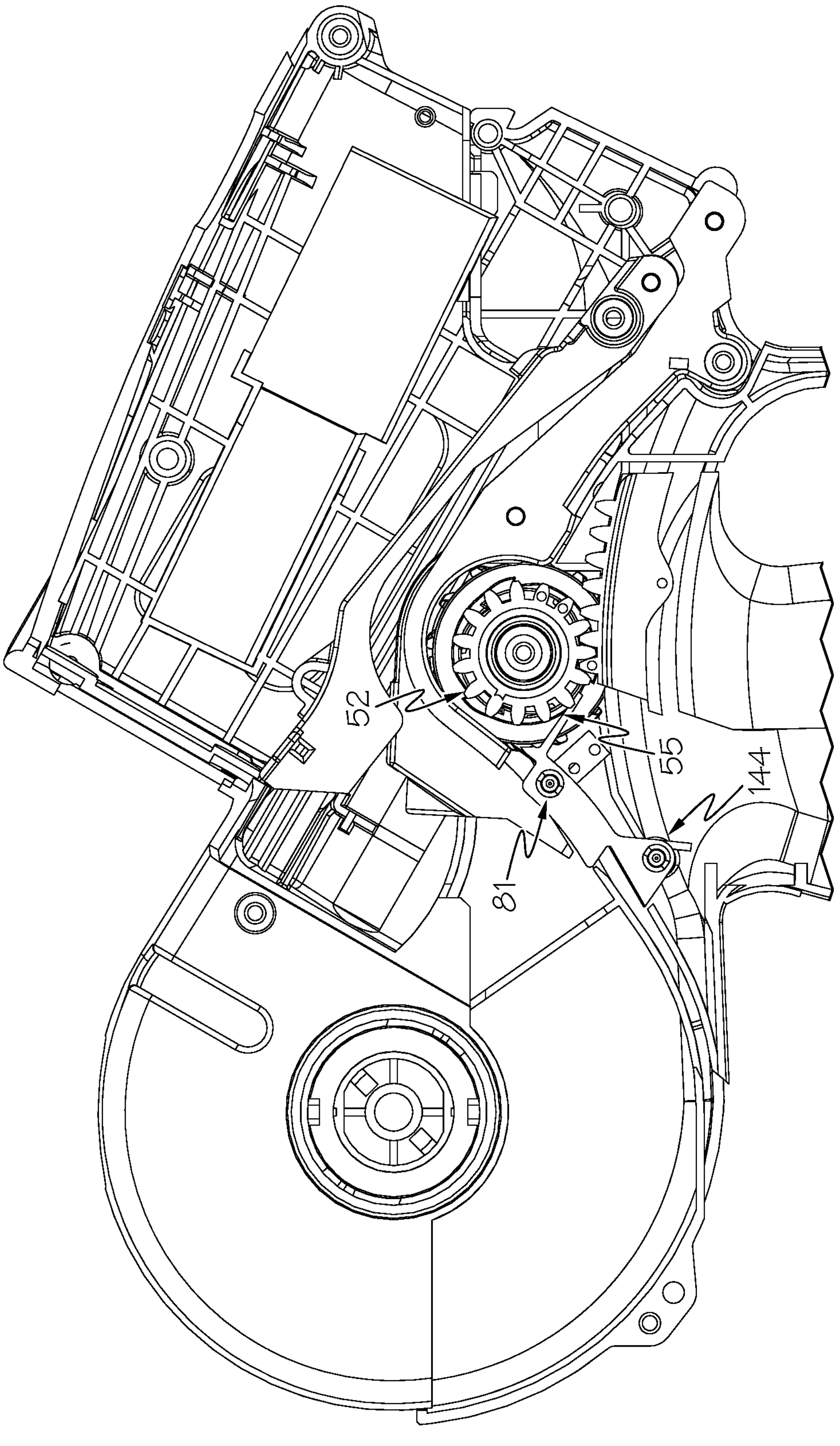
FIG. 6 illustrates a cross sectional view of the hybrid hand labeler in accordance with the disclosed architecture.

As illustrated in FIGS. 4 and 6, the feed rack 43 comprises a plurality of gear sections 44 and 45. Feed rack 43 sits in grooves in side cover pocket 8 shown in FIG. 2, and side cover pocket 9 shown in FIG. 3. Gear sections 44 and 45 of the feed rack 43 of actuator 28 engage with gears 46 and 47 of the toothed driver 50 to provide engagement between the actuator 28 and the pawl 55. This gearing is part of a unique and novel drive connection between the actuator 28 (combined of lever 11, spring assembly 144, feed rack 44, tipping component 413, and engage sensor 412), and the toothed driver 50 as described infra.

The integral feed wheel 51, ratchet wheel 53 and the gears 46 and 47 are rotatable on a post 56 on the body portion 33 as illustrated in FIG. 2. The post 56 is received in a recess 57 in the body portion 36 of the housing 21, as illustrated in FIG. 3, and gears 46 and 47 are received on a shaft 18 that is integral with feed wheel 51.

As illustrated in FIG. 6, the hybrid hand labeler 10 may further comprise a deflector 81 to help release the delaminated web of pressure sensitive backing material 89 from the teeth 52 on feed wheel 51. The deflector 81 is secured to the housing 21 by pairs of posts 82, 83 and 84, 85, as best illustrated in FIG. 10. The anti-backup pawl 55 engages with the ratchet wheel 53 to prevent retrograde movement of the ratchet wheel 53 and its associated feed wheel 51, thereby preventing a loss of tension in a feed path of the pressure sensitive material 89 between a combination of the brake surface 73/brake roll 74 illustrated in FIG. 9 and the feed wheel 51.

With respect to traditional mechanical hand labelers, the labeler will print an image when the operator/user fully engages the labeler's lever, and any action taken by the operator/user after engaging the lever has no impact on the quality of the resulting printed label. By comparison, when using the hybrid hand labeler 10 of the present invention, an image is printed on the supply web of pressure sensitive material 89 as it is driven past the print head 24'. If no care is taken, the operator could impact the quality of the printed image by the way in which he/she releases the lever 11 as the supply web of pressure sensitive material 89 passes the print head 24'. For instance in the hybrid hand labeler using the design of the traditional hand labeler where the feed rack and lever were integrated, if the user was to impede the release of the lever, the motion of the paper may stop causing a print disturbance.

As shown in FIG. 6, the feed rack 43 is separate from and pivotally connected to the lever 11. Feed rack 43 is supported by opposing rails in the lower supply cover 8 and 9 shown in FIGS. 2 and 3. Once a trip point is reached by the engaged lever 11, tipping component 413 disengages from lever 11. Upon disengagement, the spring assembly 144 then pushes the feed rack 43 forward, moving the supply web of pressure sensitive material 89 forward past printhead 24' and removing the operator's actions from impacting supply movement and/or print quality. Once the operator releases the lever 11 to return to the start position, the tipping component 413 resets for the feed rack 43 and awaits the next printing operation. The pair of spaced apart arcuate gear sections 44 and 45 of the feed rack 43 interact with gears 46 and 47 of the feed wheel 51 to rotate the feed wheel 51 as the supply web of pressure sensitive material 89 moves forward past the print head 24'.

Another advantage of separating the feed rack 43 from the lever 11 is supply size flexibility. More specifically, in mechanical hand labelers the distance the supply matrix advances may be integrally related to the engagement of the feed rack with gears, and, in traditional mechanical hand labelers, the feed rack is integral with the lever thereby requiring a different lever assembly to enable a different feed length. By comparison, in the hybrid hand labeler 10 of the present invention, the distance that the material supply 89 advances is controlled by the feed rack 43, and the feed rack 43 could be operator interchangeable thereby enabling the operator to change the material supply 89 feed distance.

Figure 7:
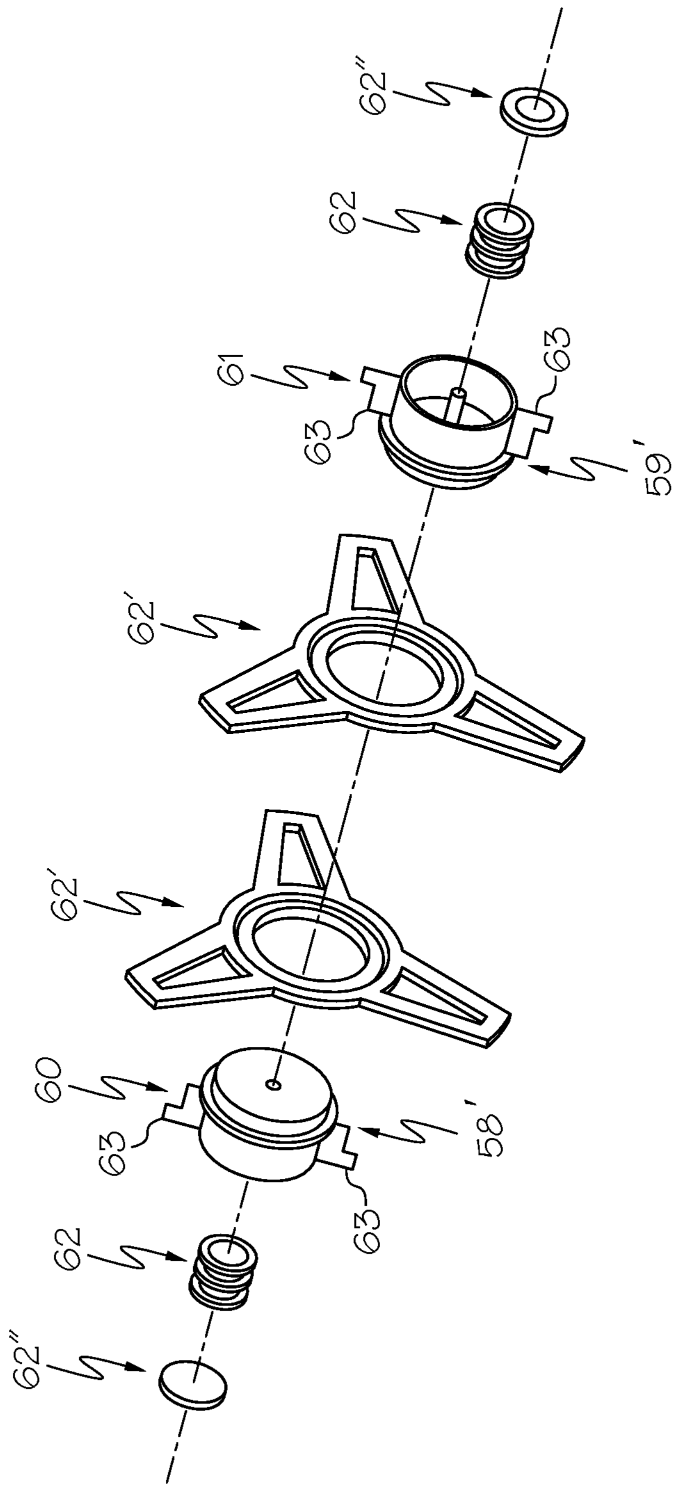
FIG. 7 illustrates an exploded view of the supply hub system of the hybrid hand labeler in accordance with the disclosed architecture.

Referring now to FIG. 7, the supply web of pressure sensitive material 89 is preferably mounted on a pair of flanges 62' that are rotatably mounted to a pair of roll mounting members 60 and 61. The roll mounting members 60 and 61 are biased toward each other, each by a compression spring 62. The mounting members 60 and 61 are also axially movable relative to one another, and each has a respective pair of cam followers 63 guided axially in an opposed pairs of slots 64, as best illustrated in FIG. 3.

As shown in FIG. 8, a plurality of cams 65, cooperable with the cam followers 63 when the upper housing portion 23 is being opened and closed, are located within the upper housing left side portion 38. More specifically, when the upper housing portion 23 is being opened from the closed position shown in FIG. 1 to the open position shown in FIG. 11, the cams 65 acting on the cam followers 63 move the mounting members 60 and 61 apart to enable the roll of the supply of pressure sensitive material 89 to be inserted between a pair of spaced apart flanges 62', or to enable a spent core of the pressure sensitive material 89 to be removed from the hybrid hand labeler 10. The pair of flanges 62' engage mounting members 60 and 61 via the annular rings 58' and 59'. Reference numeral 62" indicates a brand identification plate that may be included to show product branding.

When the upper housing portion 23 is returned to its closed position, as depicted in FIG. 1, the compression springs 62 urge mounting members 60, 61 relatively closer to one another. As best illustrated in FIG. 8, upper housing portion 23 further comprises a cover 66 comprising a pair of slots 66' therein that enable the user/operator to view an amount of the supply of pressure sensitive material roll 89 that remains available for use inside hybrid hand labeler 10 without having to disassemble the device.

Figure 9:
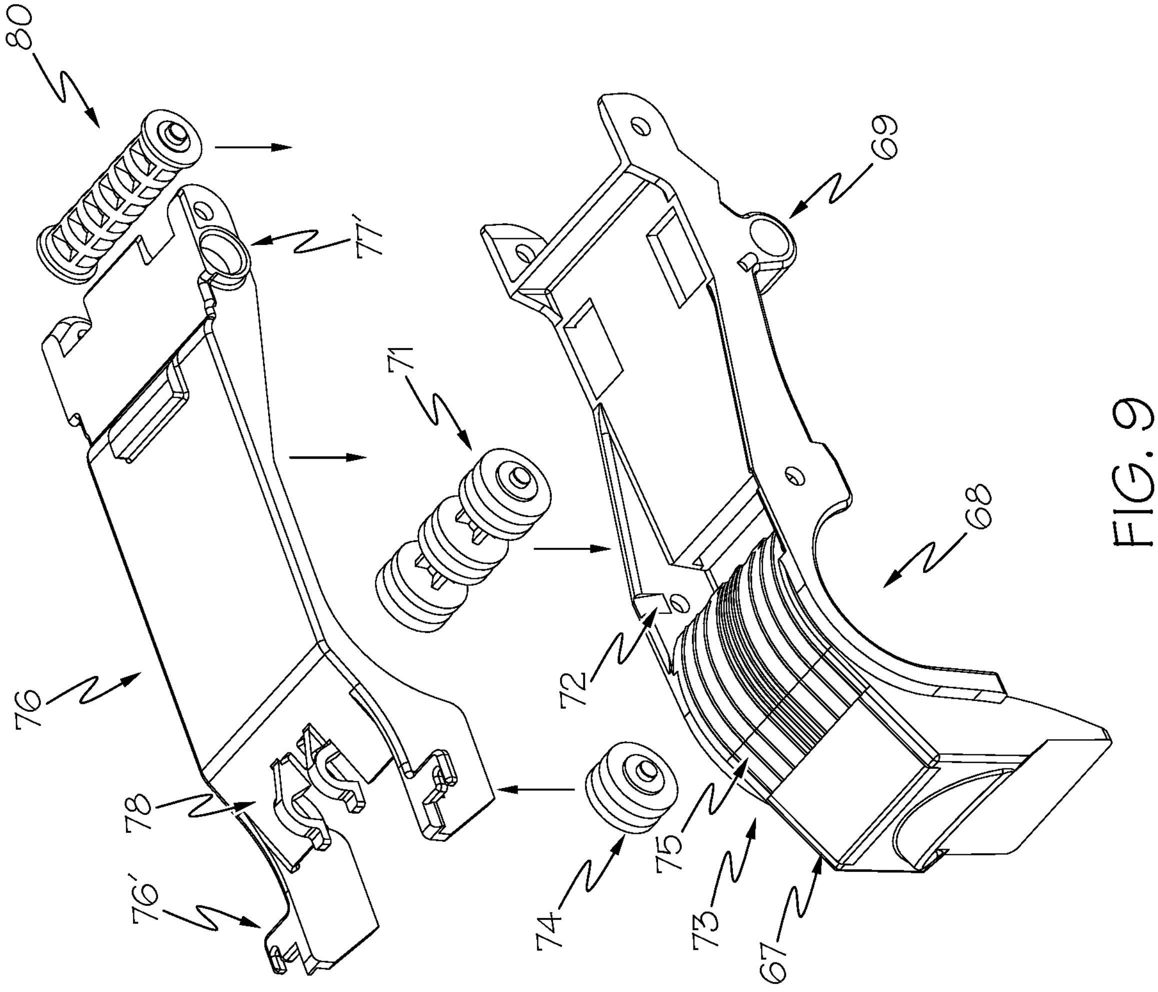
FIG. 9 illustrates a perspective, partially exploded view of a portion of the supply path controlling system of the hybrid hand labeler in accordance with the disclosed architecture.
Figure 10:
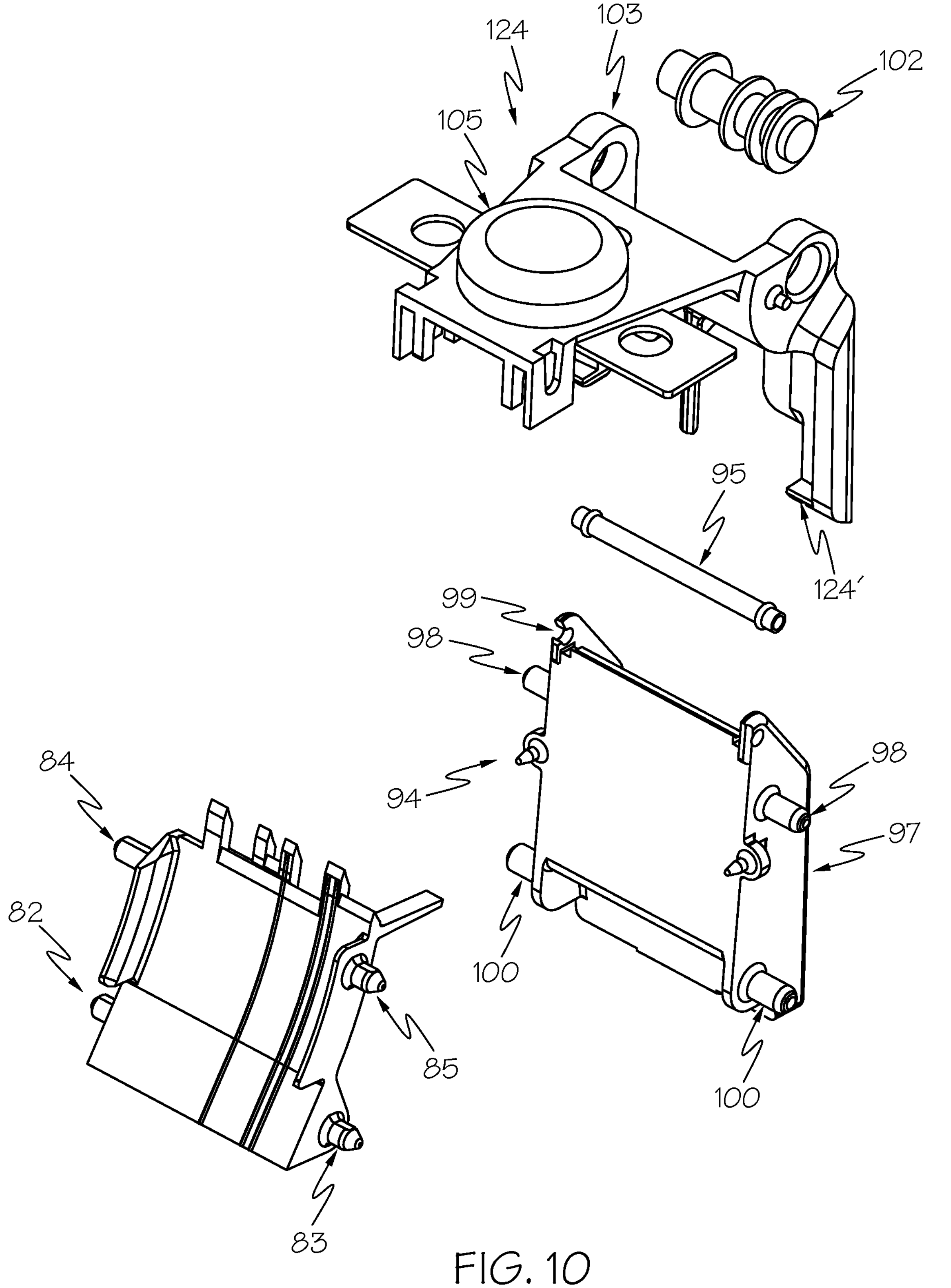
FIG. 10 illustrates a perspective, partially exploded view of a portion of the hybrid hand labeler in accordance with the disclosed architecture.

FIG. 9 illustrates a perspective view of a supply path system of the hybrid hand labeler 10. The hybrid hand labeler 10 further comprises a one-piece multifunction member 67 comprising an arcuate portion 68 received about, and for partially surrounding, the toothed driver 50. Multifunction member 67 further comprises a pair of spaced apart openings 69 for receipt of a post 70, as best illustrated in FIG. 2, upon which multifunction member 67 is pivotally mounted. Additionally, multifunction member 67 comprises a pair of spaced apart flexible arms 72 for receipt of a die roller 71, which is mounted thereon, a brake surface 73 that interacts with a brake roll 74 to provide a braking function, and a guide surface 75 for the supply of pressure sensitive material 89.

As best shown in FIG. 9, the hybrid hand labeler 10 further comprises a second multifunction member 76 upon which the brake roll 74 and a direction changing or transfer roller 80 are rotatably mounted. More specifically, the brake roll 74 cooperates with the composite label web 89 and the brake surface 73 to provide a braking function and is attached to brake roll holder 78. In operation, the composite label web 89 passes between the brake roll 74 and the brake surface 73. Second member 76 is further comprised of a pair of openings 77' for receipt of a mounting post 79 on upper housing portion 23. Further, second member 76 has opposed resilient and generally C-shaped sockets 76' which are used to secure member 76 to the upper left side housing portion 38, and that also serve as a guide for the web 89 when the hybrid hand labeler 10 is being threaded with a new web.

As illustrated in FIG. 10, the hybrid hand labeler 10 further comprises an assembly 94 that is comprised of a rotatably mounted peel roller or delaminator 95, a platen 97, and sockets 99. More specifically, delaminator 95 is mounted in sockets 99. The assembly 94 further comprises a pair of opposed locators 98 and 100. The left upper cover body portion 38 and the right upper cover portion 39 are fastened and held together as a unit by a post 103 (illustrated in FIG. 8) and by a stud 63*a* received in a hole 63*b* and a screw 63*c*.

Figure 11:
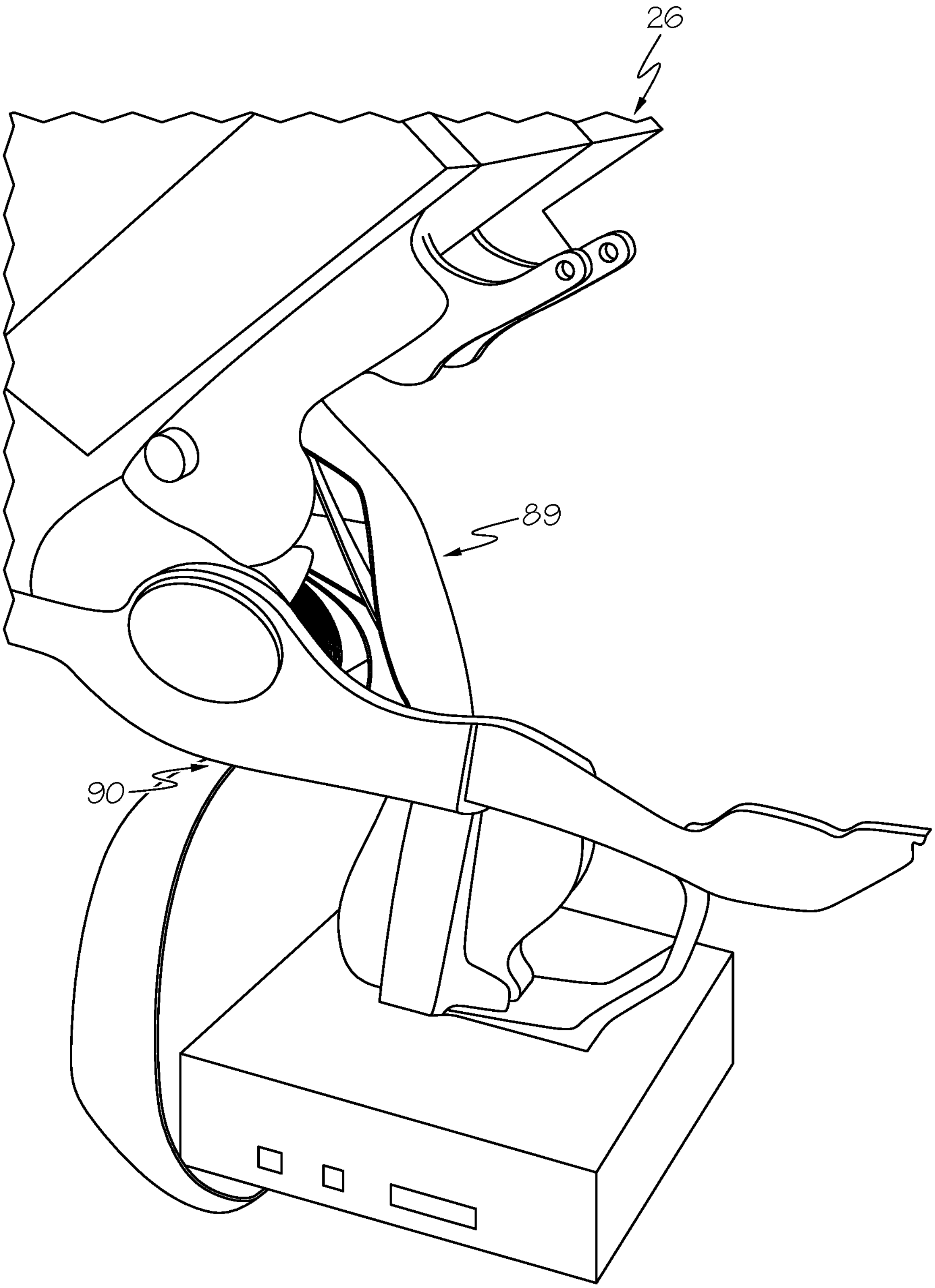
FIG. 11 illustrates a partial perspective view of the hybrid hand labeler in an open position in accordance with the disclosed architecture.

In order to load the hybrid hand labeler 10 with label web 89, the user depresses a button 105 on a latch assembly 124. The depression of button 105 engages a spring which releases a hook 124' thereby unlatching the upper housing portion 23 from lower housing portion 22, and permitting upper housing portion 23 to be pivoted about an axis and into its open position, as best shown in FIG. 11. An interlock is positioned between the lower housing portion 22 and the latch assembly 124 to prevent the latch from becoming unintentionally unlatched. In the open position, mounting members 60 and 61 have moved sufficiently apart to enable a user/operator to insert and install the supply web of pressure sensitive material 89 on flanges 62'. Thereupon, the composite label web 89 is laid over the brake surface 73 (beneath the second member 76), guide surface 75, delaminator 95, and beyond.

After successful installation of a supply web of pressure sensitive material 89 in hybrid hand labeler 10, the upper housing portion 23 can be closed, as best shown in FIG. 1. As illustrated in FIG. 9, the web 89 is typically then passed between feed wheel 51 and die roller 71, and is engaged by feed wheel teeth 52 to be advanced beneath arcuate portion 68 as the actuator 28 is repeatedly manually operated. Composite web of pressure sensitive material 89 also passes through an exit chute 88 as shown in FIG. 1, and out of the hybrid hand labeler 10. As the tension in composite web 89 increases, labels are peeled or delaminated from the carrier web 89 by delaminator 95 and spent liner exits the printer at 90. Thereafter, only the carrier web 89 passes about the delaminator 95 because the labels have been delaminated therefrom and the labels are applied by the user with the aid of a plurality of applicator rollers 102, as shown in FIG. 10. Applicator rollers 102 are mounted on applicator post 103 as shown in FIG. 8 with a screw or other fastener on the upper portion of the housing 23.

Figure 12:
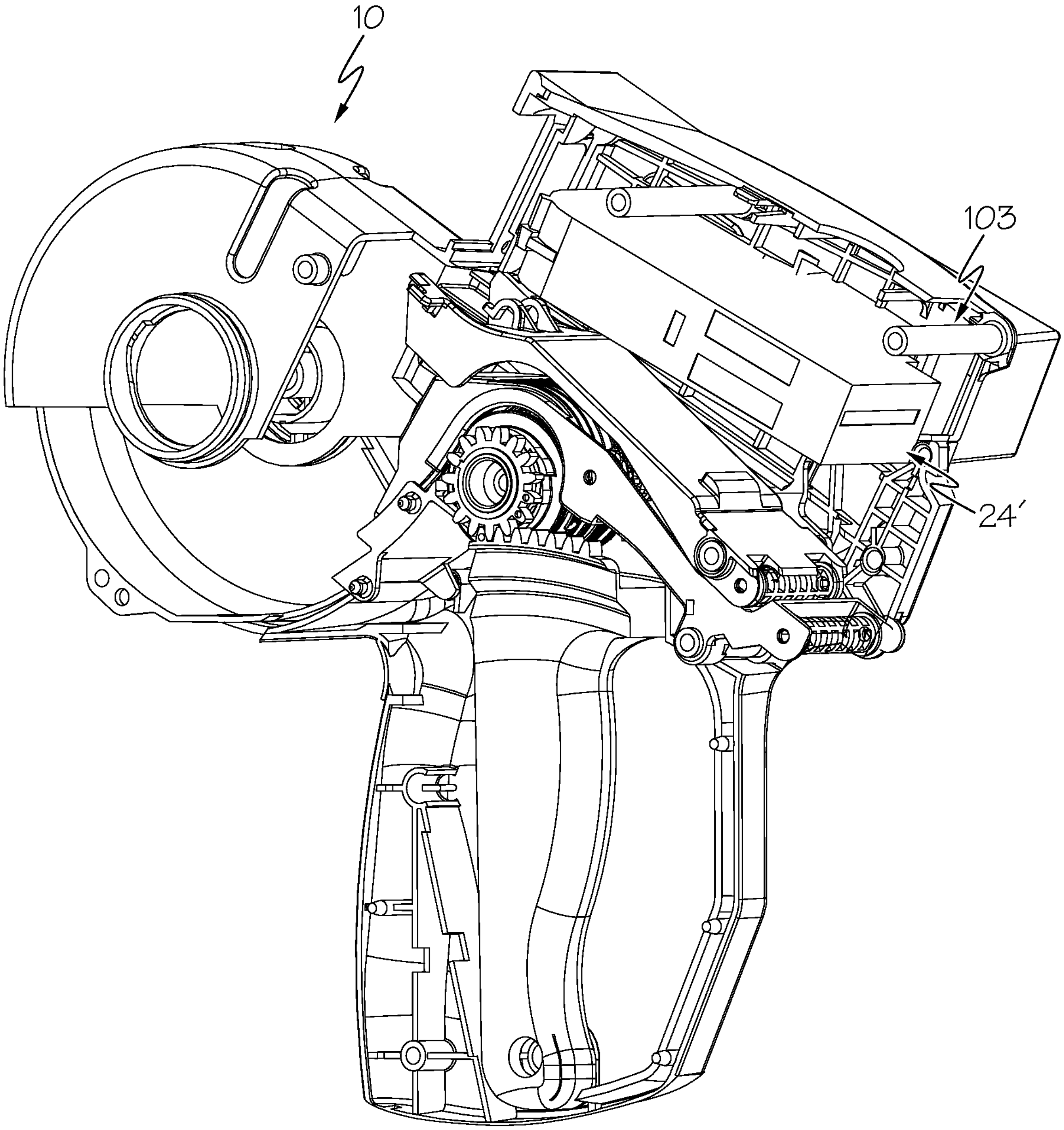
FIG. 12 illustrates a perspective, partial sectioned view of the ink jet head location in relation to the supply exit point and showing the minimized no print zone.

A roll of pressure sensitive material 89 is shown to be mounted in the housing 21 in FIG. 11. The composite label material 89 may be of a type manufactured and sold by Avery Dennison Corporation of Glendale, Calif. and is typically wound on a core and includes a series of labels releasably adhered by pressure sensitive adhesive to a carrier web, as is known in the art. In FIG. 12, print head 24' is shown in reference to applicator post 103 and its location minimizes the "no print zone." In a mechanical labeler it is typically not possible to reverse the supply of label material so the print zone is minimized, which is the printed label exit point from hybrid hand labeler 10. More specifically, the print head 24' has been placed in housing 21 to minimize the distance from the dot line in print head 24' to the peel point, and minimizes the no print zone on the label.

Generally stated, when the lever 11 of hybrid hand labeler 10 is depressed or activated, the sensor is engaged and signals to a controller and eventually to the ink jet print head 24' to begin printing the desired image on a portion of web 89 while it is positioned adjacent to print head 24'. More specifically, the pressure sensitive web 89 moves past the ink jet print head 24' and is directed upwardly across the printing surface where it is successfully printed upon. Each pressure sensitive label is printed on the printing surface by energizing of the ink jet print head 24' in response to activation of the lever 11 and the unique drive mechanism referenced above, and the web of pressure sensitive material 89 is advanced by a predetermined increment when the lever 11 is released. Said predetermined increment can be adjusted to suit a particular user's needs and/or to match the spacing of the labels on the carrier web 89. The resulting printed label is then peeled from the carrier web when the carrier web is reversed about delaminating roller 95, and directed downwardly and rearwardly through the hand labeler 10. Once removed from the carrier web 89, the label is positioned against a serrated edge of hybrid hand labeler 10, which supports the printed image (label) detached from the carrier web and allows the image (label) to be applied to an article).

Figure 23:
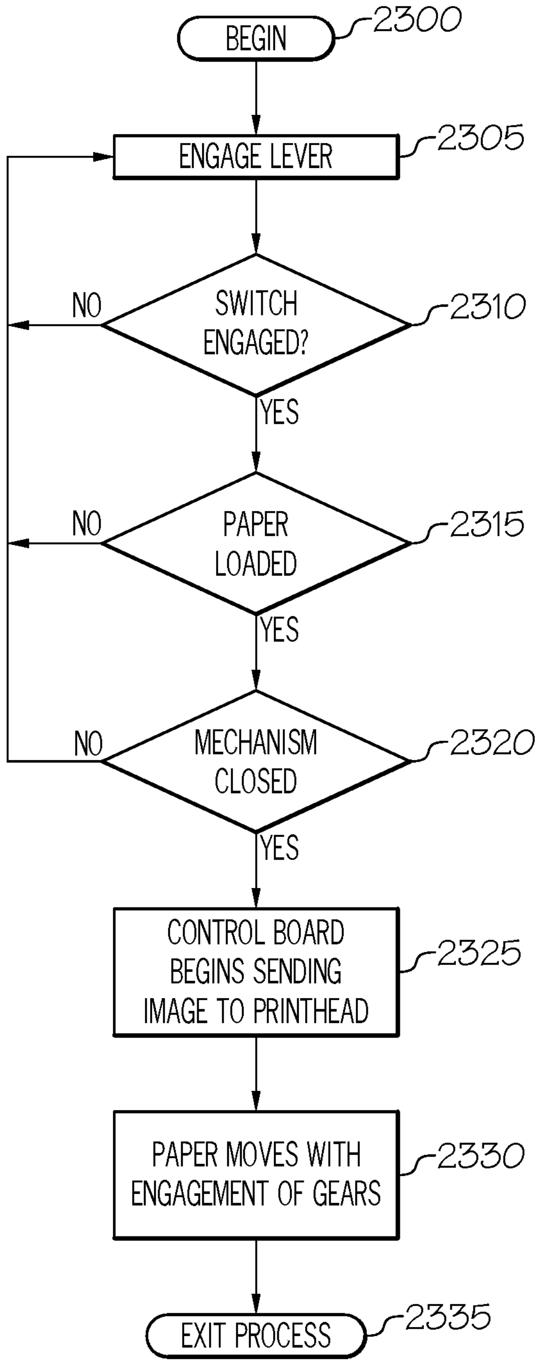
FIG. 23 illustrates a flowchart for printing a digital label with the hybrid hand labeler in accordance with the disclosed architecture.

More specifically, normal print function occurs when the mechanical lever 11 is fully depressed or engaged with a plunger 411 contained on lever 11, as best shown in FIG. 4. Lever 11 is also in communication with the sensor/switch 412, which is, in turn, connected to the control board/processor/MPU 700 illustrated in FIG. 16. Engaging the sensor/switch 412 signals the hand labeler processor 700 to begin the print process. For example, FIG. 23 depicts a graphical representation of a process of engaging lever 11 to initiate the print process, which begins at step 2300. At step 2305, lever 11 is engaged. Once lever 11 has been engaged, at step 2310, a determination of whether sensor/switch 412 has been engaged is made. If sensor/switch 412 has not been engaged, the process returns to step 2300 and the process begins anew. If sensor/switch 412 has been engaged, at step 2315, a determination of whether a web of pressure sensitive material 89 has been loaded into hybrid hand labeler 10 is made. If no web material 89 is loaded, the process returns to 2300 so that a user/operator may load the web material 89 and begin the process again. If web material 89 has been loaded, at step 2320, a determination of whether hybrid hand labeler 10 is in the closed position is made. If hybrid hand labeler 10 is in the open position (as shown in FIG. 11), the process returns to step 2300 so that a user/operator may close hybrid hand labeler 10 and begin the process again. If hybrid hand labeler 10 is in the closed position (as shown in FIG. 1), at step 2325, the control board/processor 700 begins sending a selected image to print head 24' and the web 89 is advanced by the above described gear mechanism at step 2330 before the process ends at step 2335.

Figure 5A:
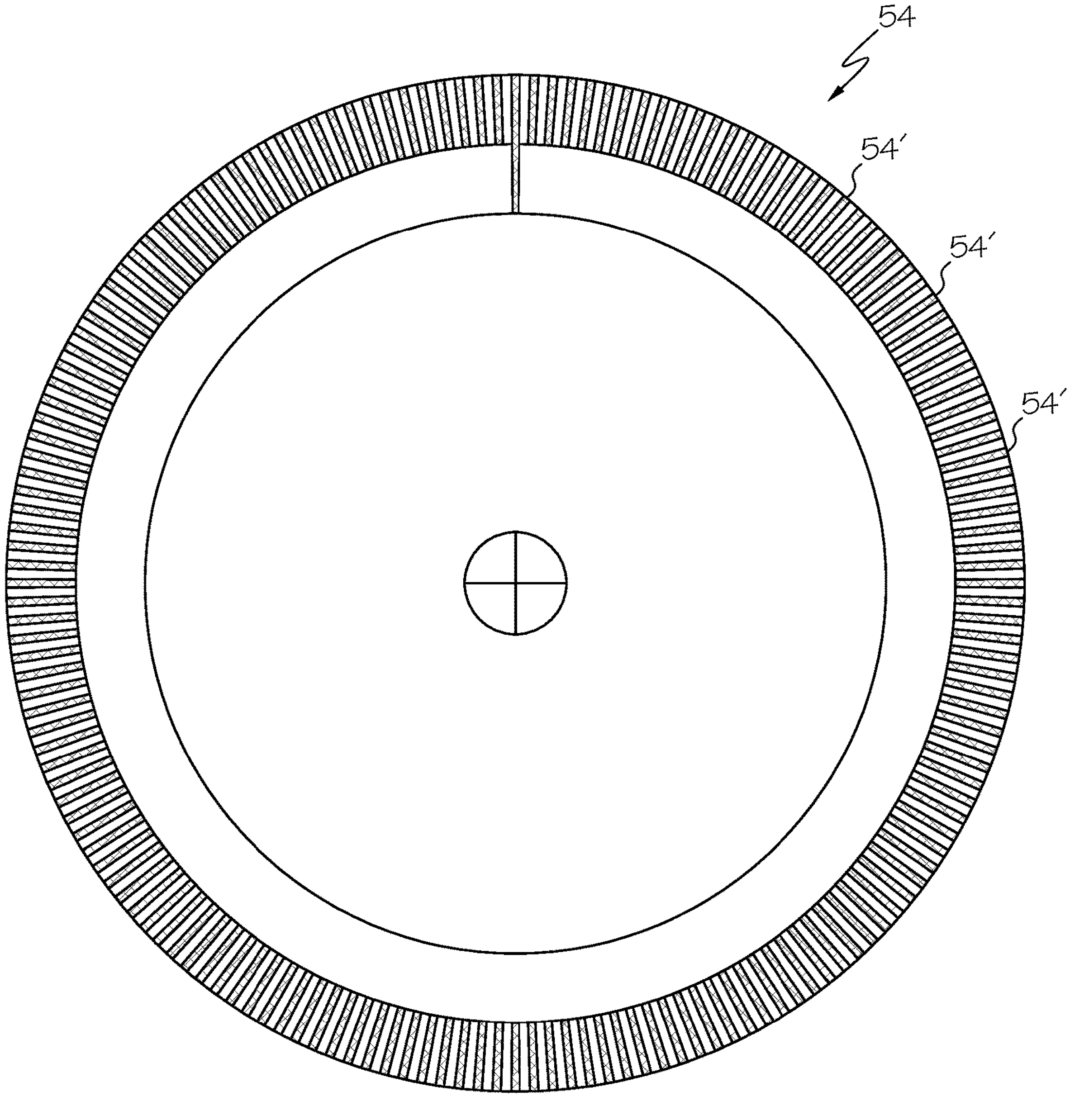
FIG. 5A illustrates a reflective encoder disk used to measure the speed and position of the feedstock.

During the above described printing process, the reflective encoder disk 54, which is mounted directly to feed wheel 51, is used to determine the paper speed and/or position, and in cooperation with the encoder board and controller board accurately signals the ink jet head 24' to print after the user releases lever 11 as determined by engagement sensor 412. A number of encoder disk reflective points, in one contemplated embodiment, may match the dots/inch of the ink jet print head 24', or any practical ratio of the same. For example, and without limitation, the following ratios could be used: 2:1; 1:2, 3:2, etc. The encoder disk 54 is premade with evenly spaced lines 54' as shown in FIG. 5A.

Figure 13:
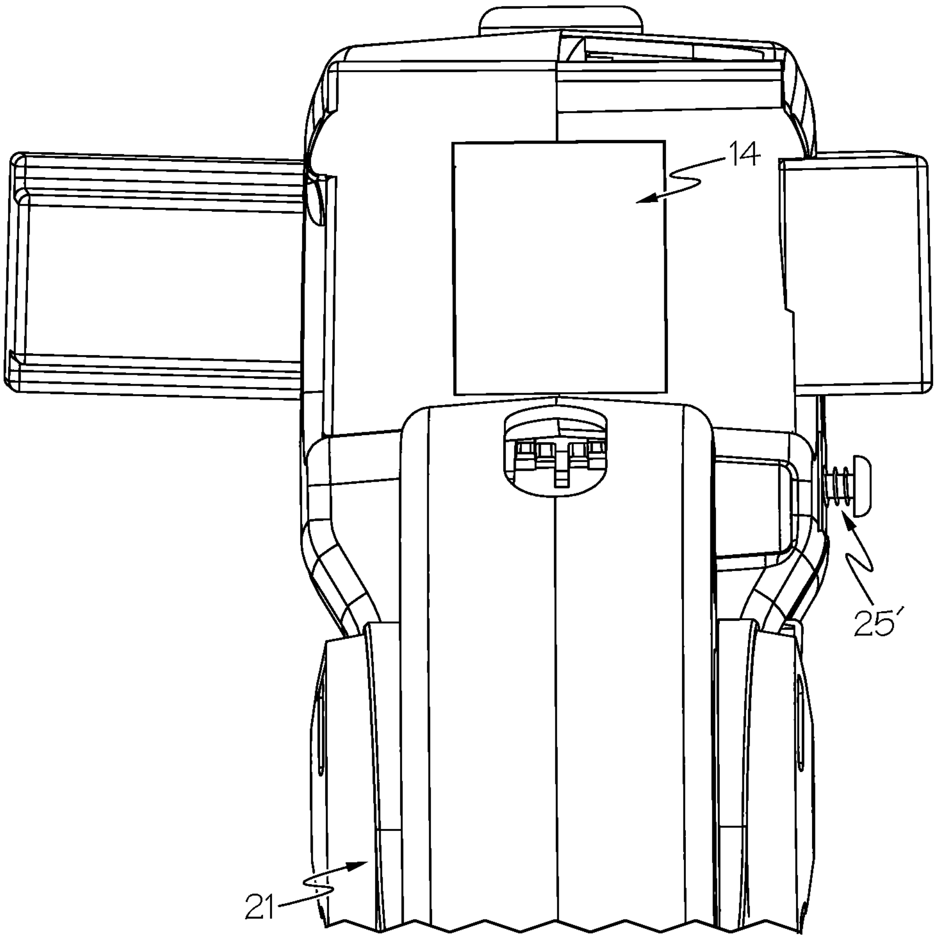
FIG. 13 illustrates a perspective view of the printer display and joystick in accordance with the disclosed architecture.
Figure 14:
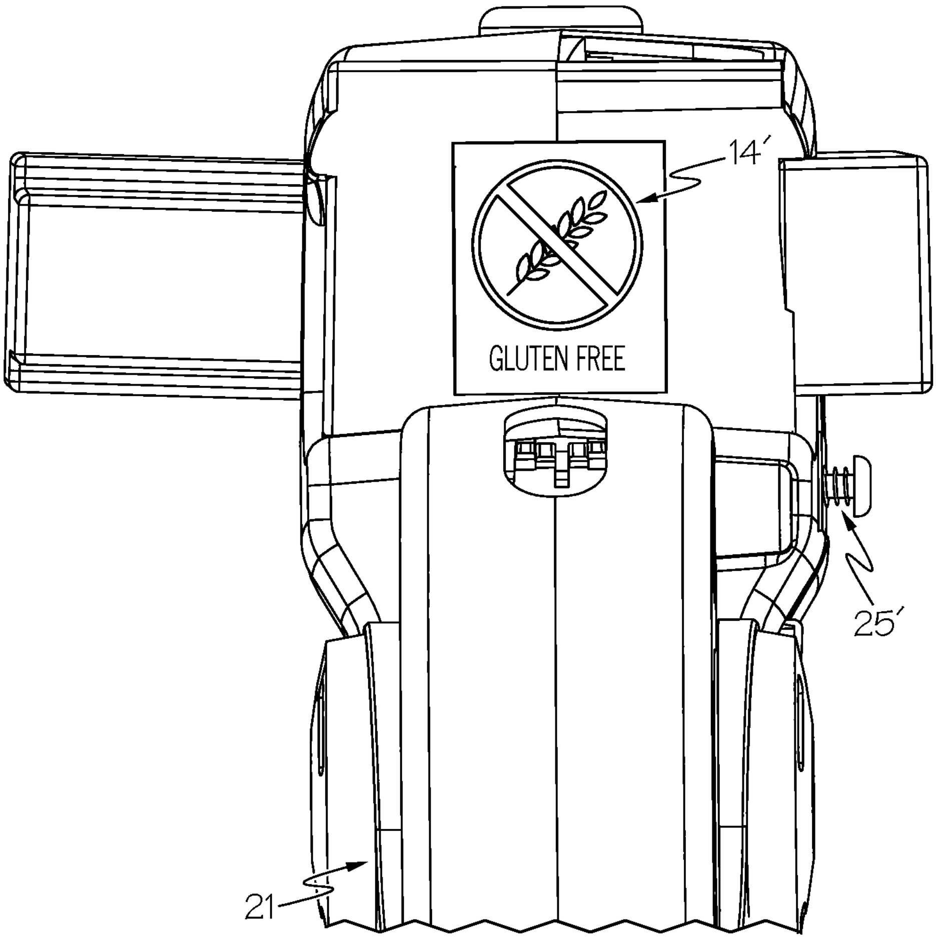
FIG. 14 illustrates a perspective view of the printer display illustrating a view of a template and the joystick in accordance with the disclosed architecture.

FIG. 13 illustrates a perspective view of the human/machine interface for hybrid hand labeler 10, which comprises the user display 14 mounted in housing 21, and the joystick 25' for enabling the user to manipulate and interact with the interactive user display 14. FIG. 14 illustrates an example of one potential "what you see is what you get" (WYSIWYG) image 14' that a user can select from a memory 736, and preview before printing to the web of pressure sensitive material 89. More specifically, the user utilizes joystick 25' to scroll through the various commands/options stored in memory 736, and to make appropriate selections from the same.

Figure 15:
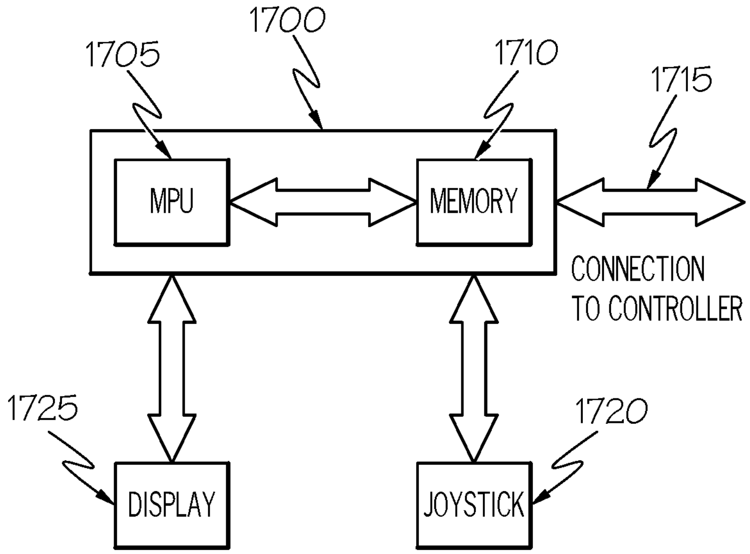
FIG. 15 illustrates a user human interface control board block diagram for the hybrid hand labeler in accordance with the disclosed architecture.

FIG. 15 depicts a machine interface control board 1700, wherein the various components of control board 1700 are identified. More specifically, control board 1700 comprises a display controller 1725, a joystick interface 1720 and connection to controller board 700 at 1715 which communicate with an MPU 1705 and a memory 1710. In one embodiment, machine interface controller board 1700 is shown as a separate printed controller board, however, it should be appreciated that machine controller board 1700 could also be integrated into control board 700.

Figure 16:
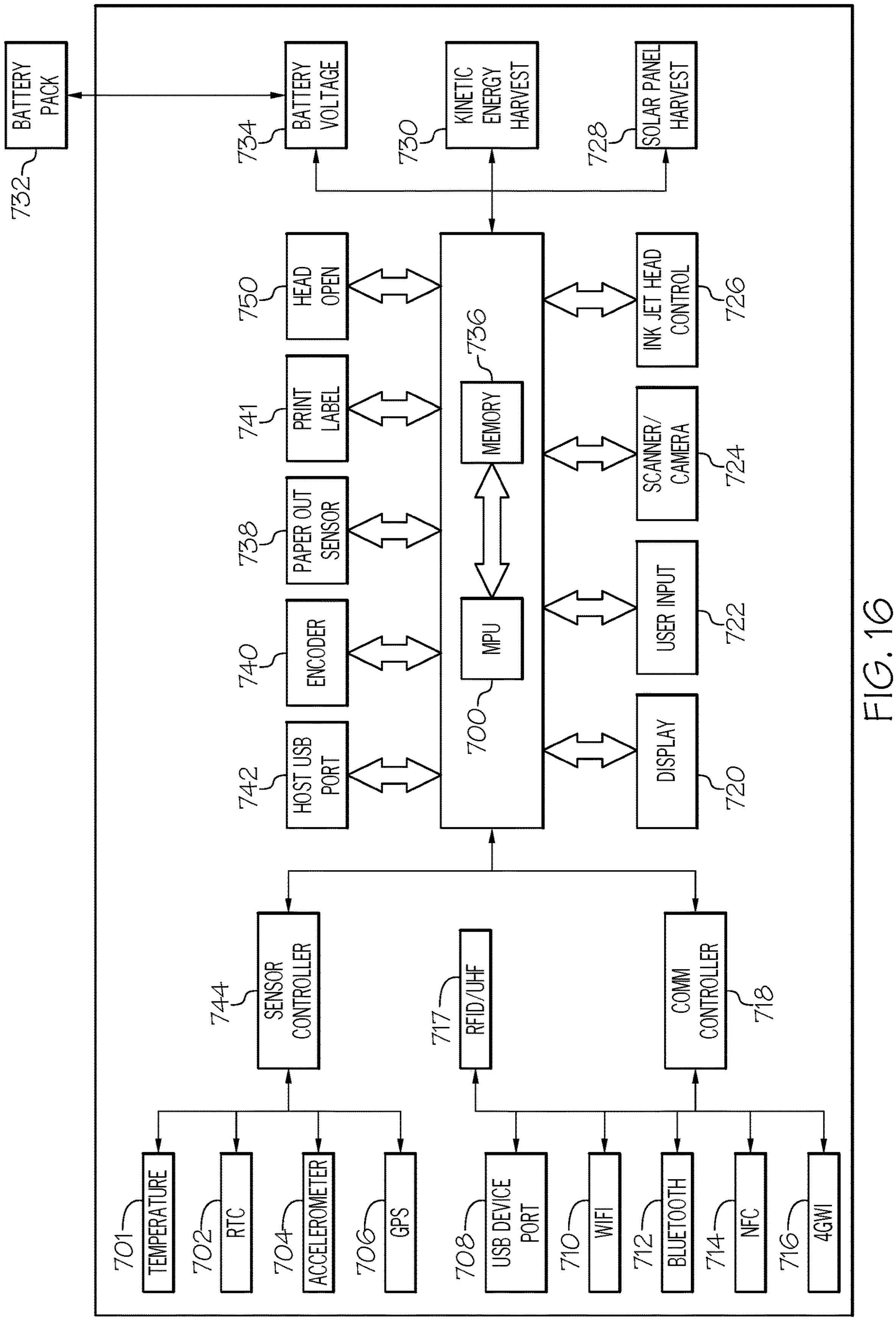
FIG. 16 illustrates a control board block diagram for the hybrid hand labeler in accordance with the disclosed architecture.

The control board 700 is disclosed in FIG. 16, wherein the various components of the control board 700 are identified. More specifically, the control board 700 comprises a sensor controller 744 which may have a temperature sensor 701, a RTC 702, an accelerometer 704, and GPS 706 capabilities. Also, the control board 700 further comprises a UHF RFID encoder 717 and a communication controller 718 which may be in communication with one or more of a USB device port 708, a WiFi 710, a Bluetooth 712, a NFC (near field communication) 714, and a 4 GWi 716. The sensor controller 744 and the communication controller 718 both communicate with the MPU 700 and memory 736, which communicate with a battery voltage 734, a kinetic energy harvester 730, a solar panel harvester 728, and a battery pack 732. Other components that are capable of communicating with MPU 700 and memory 736 include a host USB port 742, an encoder 740, a paper out sensor 738, a print label 741, a head open sensor 750, a display 720, a user input 722, a scanner/camera 724, and an ink jet head control 726.

Figure 17:
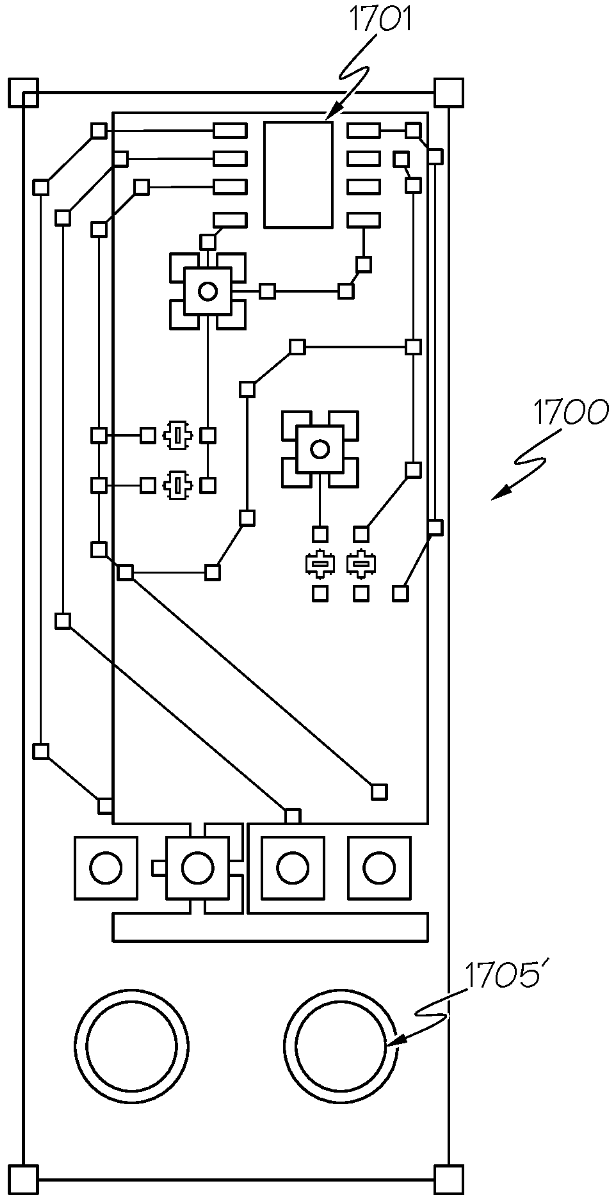
FIG. 17 illustrates a perspective view of an encoder board for the hybrid hand labeler in accordance with the disclosed architecture.

FIG. 17 depicts the encoder board 1700 comprising a reflective optical encoder 1701 and a plurality of mounting features 1705'. Encoder board 1700 is mounted with a fastener such as, but not limited to, screws, to deflector 81 via mounting features 1705'. As the supply feed wheel 51 rotates to move the supply of web material 89, the reflective optical encoder 1701 captures the movement from the feed wheel 51 that has mounted the encoder disk 54 shown in FIG. 5A in preset increments and signals processor 700 to control printing the digital image as the supply of web material 89 moves past printhead 24'.

Figure 18:
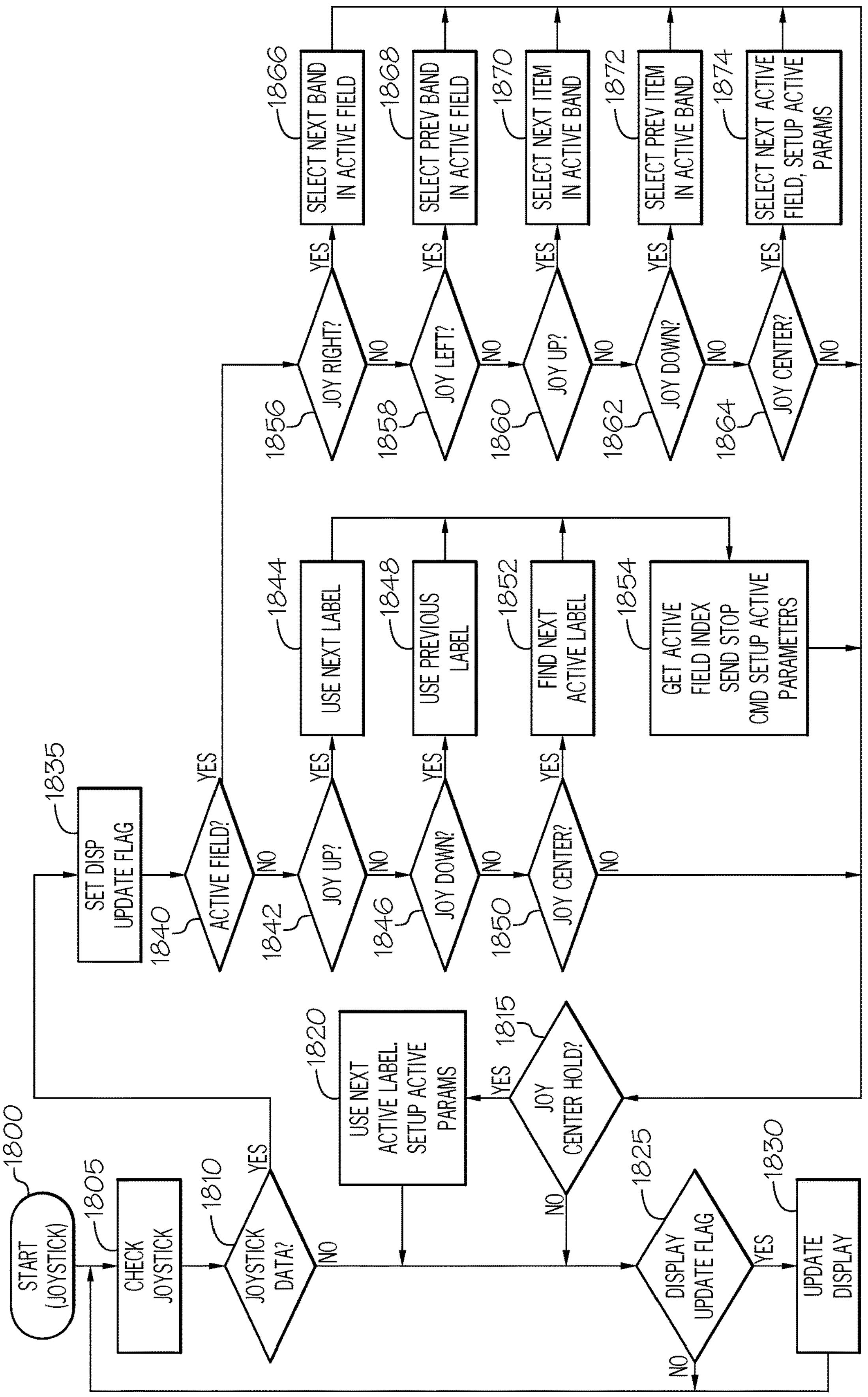
FIG. 18 illustrates a flowchart for operating the user interface of the hybrid hand labeler in accordance with the disclosed architecture.

A process flow for the human/machine interface is depicted generally in FIG. 18 where the process begins at step 1800. More specifically, at step 1805, the process checks for input from joystick 25' at step 1810. If there is no joystick data, at step 1810, the process next checks the update display flag at step 1825. If the display needs to be refreshed, it is refreshed at step 1830. In both cases, the process returns to checking for joystick data at step 1805.

If there is joystick data, at step 1805, the process sets the display update flag in step 1835. At step 1840, the process then checks for an active field. If an active field is present, the user can select input from either graphic, word or character bands by moving joystick 25' in a particular direction. For example, a right joystick movement at step 1856 will enable the user to select the next band in the active field at step 1866 or remain on the same band if there is only one band in the active field at step 1866. The joystick center hold is next checked at step 1815 and moves to step 1820 to move to the next active label if there is more than one digital label in the labeler and setup the active parameters where the above flow is rejoined at step 1825. If the joystick is not held, the process moves directly to step 1825.

If the joystick left input is received, at step 1858, the user selects the previous band in the active field or remains on the same band if there is only one band in the active field at step 1868. The joystick center hold is next checked at step 1815 and moves to step 1820 to move to the next active label if there is more than one digital label in the labeler and setup the active parameters where the above flow is rejoined at step 1825. If the joystick is not held the process moves directly to step 1825.

An upward joystick movement at step 1860 will enable the user to select the next character/item in an active band or remains on the same character if there is only one character in the active band at step 1870. The joystick center hold is next checked at step 1815 and moves to step 1820 to move to the next active label if there is more than one digital label in the labeler and setup the active parameters where the above flow is rejoined at step 1825. If the joystick is not held the process moves directly to step 1825.

A downward joystick movement at step 1862 will enable the user to select the previous character in the active band or remain on the same character in the band if there is only one character in the active band at step 1872. The joystick center hold is next checked at step 1815 and moves to step 1820 to move to the next active label if there is more than one digital label in the labeler and setup the active parameters where the above flow is rejoined at step 1825. If the joystick is not held the process moves directly to step 1825.

If joystick center is received at step 1864 the user selects the next character in the active band or remains on the same character in the band if there is only one character in the active band at step 1874. The joystick center hold is next checked in step 1815 and moves to step 1820 to move to the next active label if there is more than one digital label in the labeler and setup the active parameters where the above flow is rejoined at step 1825. If the joystick 25' is not held the process moves directly to step 1825.

Returning to decision point 1840, if there is no active field the process checks for a joystick up at step 1842 which, if received, moves to the next label at step 1844 and to getting an active field index, sending the stop command and setting up the new active parameters at step 1854. Next, if the joystick center input is checked at step 1815 and moves to step 1820 to move the next active label if there is more than one digital label in the labeler and setup the active parameters where the above flow is rejoined at step 1825. If the joystick down is received at step 1846, the process moves to the previous label at 1848 and to getting an active field index, sending the stop command and setting up the new active parameters at step 1854. Next, if the joystick center input is checked at step 1815 and moves to step 1820 to move the next active label if there is more than one digital label in the labeler and setup the active parameters where the above flow is rejoined at step 1825. If the joystick center is received at step 1850, the process moves to the next active label at step 1852 and to getting an active field index, sending the stop command and setting up the new active parameters at step 1854. If the joystick center input is checked at step 1815 and moves to step 1820 to move the next active label if there is more than one digital label in the labeler and setup the active parameters where the above flow is rejoined at step 1825.

Figure 19:
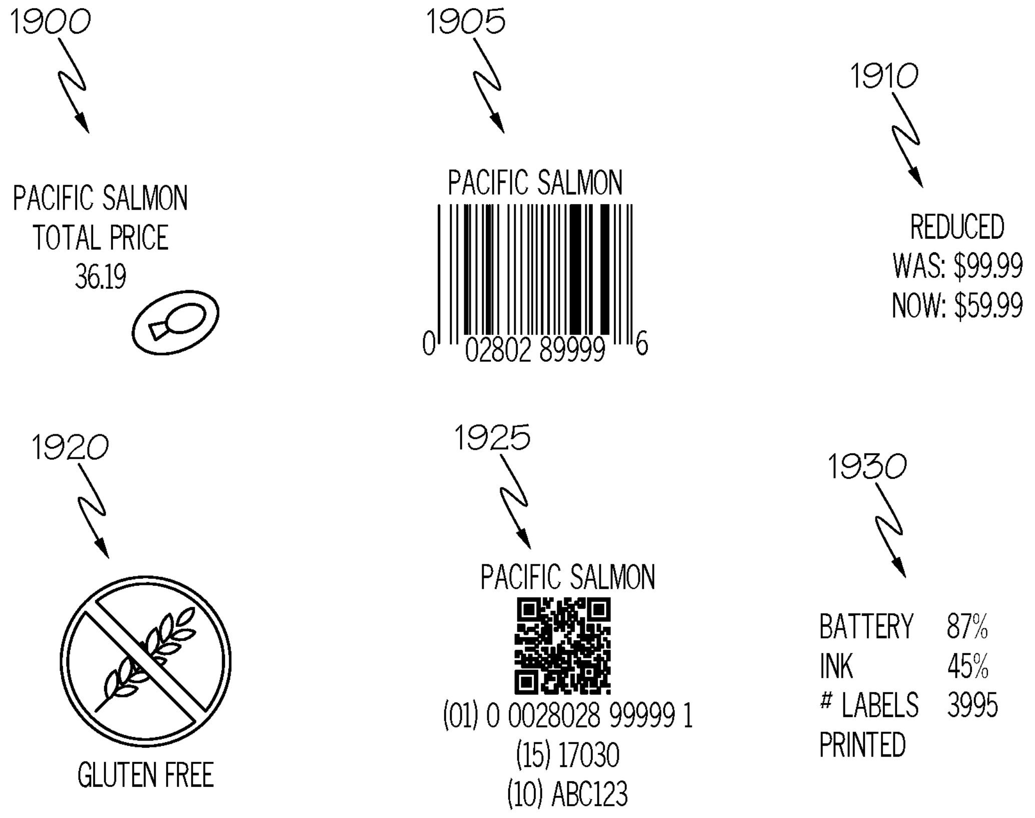
FIG. 19 illustrates a plurality of representative digital labels, including a printer diagnostic label, which may be printed by the hybrid hand labeler in accordance with the disclosed architecture.

The above process flow illustrates how digital labels and graphic, word and character bands are used with portable hybrid hand labeler 10 of the present invention. FIG. 19 illustrates a plurality of representative digital labels, including a printer/labeler diagnostic label, which could be printed by the hybrid hand labeler 10. More specifically, FIG. 19 depicts digital labels with: (i) alphanumeric text and a trademark at 1900; (ii) alphanumeric text and a bar code at 1905; (iii) alphanumeric text of varying font sizes at 1910; (iv) alphanumeric text and symbols at 1920; (v) alphanumeric text and quick response code at 1925; and (vi) alphanumeric text that is representative of printer/labeler diagnostic information at 1930. In the illustrative example at 1930, the resulting label reports on the remaining battery life, ink level and total number of labels printed on the labeler, or any other relevant data that suits user need and/or preference.

Figure 20:
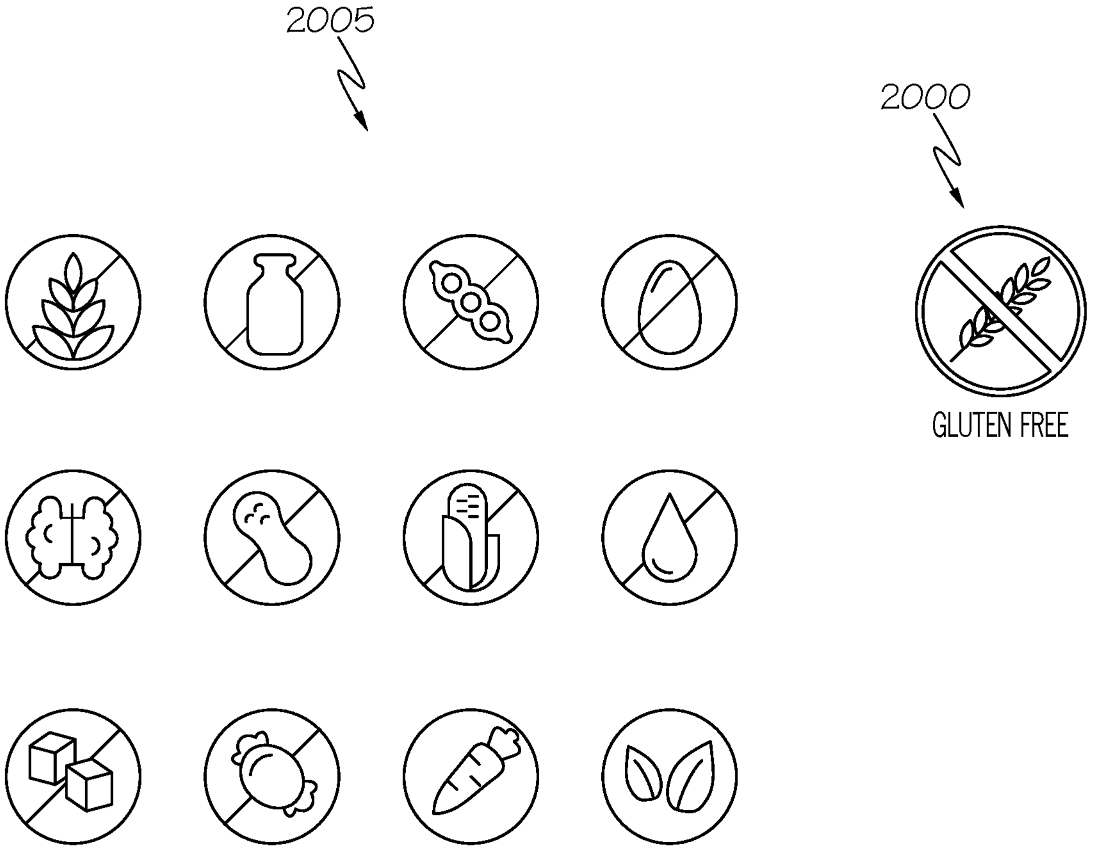
FIG. 20 illustrates a plurality of representative graphic bands that could be loaded onto the hybrid hand labeler for use and in accordance with the disclosed architecture.

FIG. 20 illustrates a representative allergen graphic band 2000, as well as a plurality of other representative graphic bands 2005 that could be loaded onto hybrid hand labeler 10. In the above described process flow, when a graphic band 2005 is in the active field a user can scroll through the illustrative elements to select the appropriate graphic band 2005 to print on a label in the web of material 89.

Figure 21:
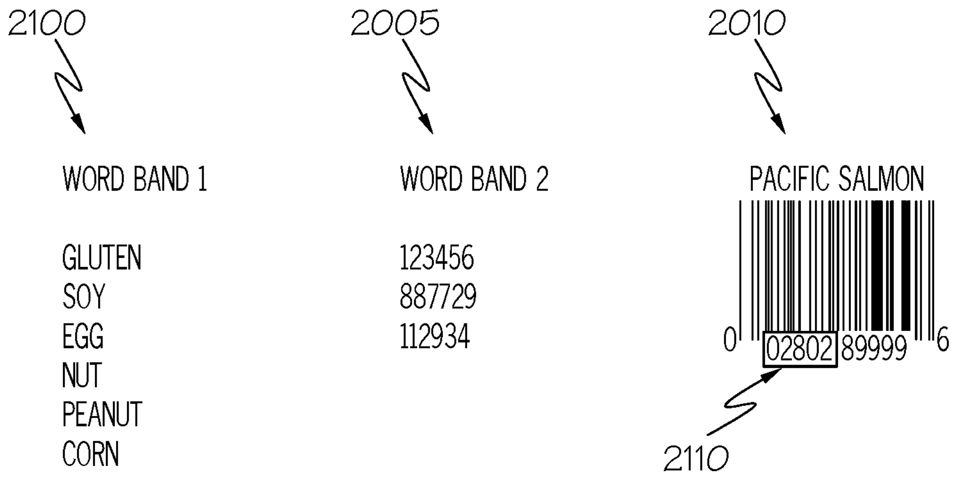
FIG. 21 illustrates a plurality of representative word bands that could be loaded onto the hybrid hand labeler for use and in accordance with the disclosed architecture.

Similarly, FIG. 21 illustrates a plurality of representative alphanumeric bands 2100 that could be loaded onto the portable hybrid hand labeler 10. In the above described process flow, when a word or alphanumeric band 2100 is in the active field a user can scroll through the available words/numerals to select the appropriate alphanumeric band 2100. Further, alphanumeric band 2100 can include a combination of alphanumeric elements and other images 2010, such as quick response codes, bar codes, trademarks, etc., such as the combination band shown at 2110.

Figure 22:
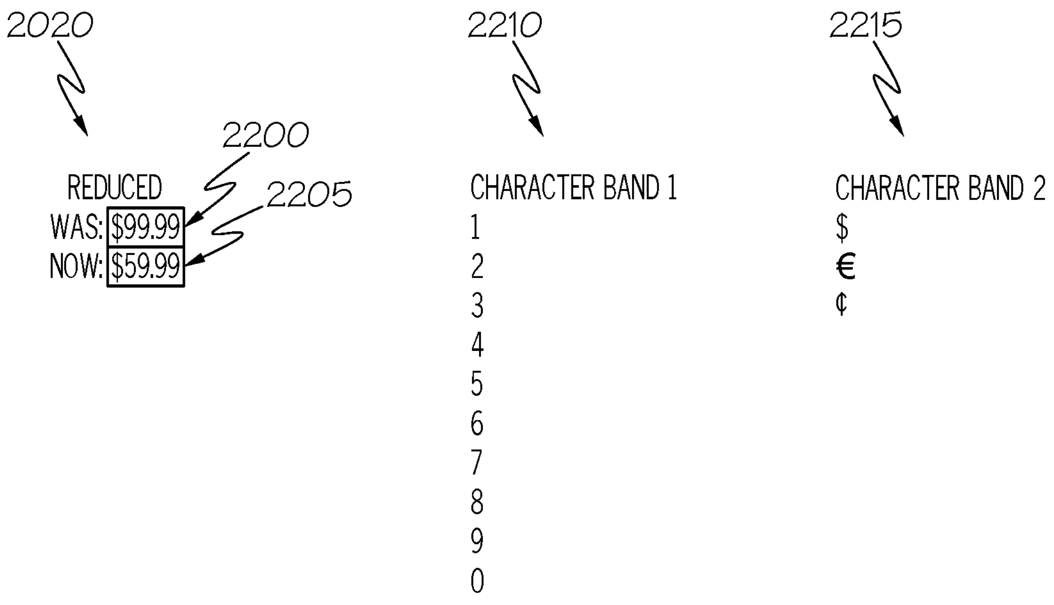
FIG. 22 illustrates a plurality of representative character bands that could be loaded onto the hybrid hand labeler in accordance with the disclosed architecture.

FIG. 22 illustrates a plurality of representative character bands 2020 that could be loaded onto hybrid hand labeler 10. For example, a label may be produced by hybrid hand labeler 10 that contains a regular price 2200 and a mark down or reduced price 2205. These fields illustrate the concept of a field comprised of several character bands as shown in 2210 and 2215. In the above described process flow, a user would be able to individually modify, for example, the characters shown in bands 2210 and 2215. Of course, one of ordinary skill in the art will appreciate that these are merely examples of the capabilities of portable hybrid hand labeler 10, and are not meant to be limitations.

As previously stated, the hybrid hand labeler also minimizes energy consumption by eliminating the need for motors, by harvesting kinetic energy from the otherwise required trigger/lever pulls, and by providing a solar panel on the display panel to collect solar energy that can be used to trickle charge the hand labeler's battery pack. The portable hybrid hand labeler of the present invention is also capable of being used with alkaline or NiCad batteries, both of which are more commonly available to the average consumer and are easily transportable.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hybrid hand labeler comprising:
a housing;
a handle portion comprising a lever;
a driver;
a feed rack;
a print head;
a tipping component that movably connects the feed rack to the lever; and
a multifunction member having a brake surface configured to provide a brake function and a guide surface configured to guide media, the multifunction member being coupled to the housing.

2. The hybrid hand labeler of claim 1 further comprising a supply roll holder for retaining a media, wherein activating the lever causes the media to advance in the hybrid hand labeler.

3. The hybrid hand labeler of claim 1 further comprising a battery, wherein activating the lever charges the battery.

4. The hybrid hand labeler of claim 1 further comprising an interactive user display and a joystick for manipulating the interactive user display.

5. The hybrid hand labeler of claim 1 further comprising a digital print mechanism and a plurality of downloadable print bands.

6. The hybrid hand labeler of claim 1, wherein the feed rack is pivotally connected to the lever.

7. The hybrid hand labeler of claim 1, wherein the driver further comprises a plurality of gears, a feed wheel, a ratchet wheel and a pawl.

8. The hybrid hand labeler of claim 7, wherein the feed rack further comprises at least one gear section for engaging the plurality of gears of the driver.

9. The hybrid hand labeler of claim 7 further comprising an encoder board and a reflector sensor for sensing a speed of the feed wheel.

10. A hybrid hand labeler comprising:
a housing;
an actuator comprising a lever, a sensor and a feed rack;
a driver;
a print head;
a tipping component that movable connects the feed rack to the lever; and
a multifunction member having a brake surface configured to provide a brake function and a guide surface configured to guide media, the multifunction member being coupled to the housing.

11. The hybrid hand labeler of claim 10, wherein said driver comprises a plurality of gears, a feed wheel, a ratchet wheel and a pawl, and further wherein said feed rack comprises at least one gear section for engaging the plurality of gears.

12. The hybrid hand labeler of claim 11 further comprising an encoder board and a reflector sensor for sensing a speed of the feed wheel.

13. The hybrid hand labeler of claim 10 further comprising an interactive user display and a joystick for manipulating the interactive user display.

14. The hybrid hand labeler of claim 13 further comprising a digital print mechanism and a plurality of downloadable print bands that are viewable on the interactive user display and selectable by the joystick.

15. The hybrid hand labeler of claim 10 further comprising a control board in communication with the sensor, wherein the sensor instructs the control board to begin a print process.

16. A method of utilizing a hybrid hand labeler having a housing, an actuator, a drive mechanism, an ink jet head, a plurality of downloadable print bands and a supply roll of media and comprising the steps of:

selecting a desired print band from the plurality of downloadable print bands;

activating the actuator;

advancing the supply roll of media to receive printing from the ink jet head;

guiding the media using a multifunction member; and printing an image from the desired print band on a portion of the supply roll of media, wherein the multifunction member comprises a brake surface configured to provide a brake function and a guide surface configured to guide media, the multifunction member being coupled to the housing, wherein the actuator comprises a feed rack, a lever, and a tipping component that movably connects the feed rack and the lever.

17. The method of claim 16, wherein the drive mechanism comprises a driver and a feed rack.

18. The method of claim 17, wherein said driver comprises a plurality of gears, a feed wheel, a ratchet wheel and a pawl, and further wherein said feed rack comprises at least one gear section for engaging the plurality of gears.

19. The method of claim 16, wherein the hybrid hand labeler further comprises a battery chargeable by activating the actuator.

20. The method of claim 16, wherein activating the actuator causes a sensor to instruct a control board to begin a printing process.

* * * * *